US011741528B1

(12) United States Patent
Gjertson et al.

(10) Patent No.: US 11,741,528 B1
(45) Date of Patent: Aug. 29, 2023

(54) APPLICATION PROGRAM INTERFACES FOR VENDOR RECOMMENDATIONS

(71) Applicant: Block, Inc., San Francisco, CA (US)

(72) Inventors: Niels Gjertson, San Francisco, CA (US); Kevin Yien, Manhasset, NY (US); Bruce Bell, New York, NY (US)

(73) Assignee: Block, Inc., Oakland, CA (US)

( * ) Notice: Subject to any disclaimer, the term of this patent is extended or adjusted under 35 U.S.C. 154(b) by 164 days.

(21) Appl. No.: 16/248,524

(22) Filed: Jan. 15, 2019

(51) Int. Cl.
*G06Q 30/00* (2023.01)
*G06Q 30/0601* (2023.01)
*G06Q 10/063* (2023.01)

(52) U.S. Cl.
CPC .............. *G06Q 30/0635* (2013.01); *G06Q 30/0631* (2013.01)

(58) Field of Classification Search
CPC ............ G06Q 30/0635; G06Q 30/0631; G06Q 30/0601; G06Q 30/0645
See application file for complete search history.

(56) References Cited

U.S. PATENT DOCUMENTS

| | | | |
|---|---|---|---|
| 8,719,142 B1 | 5/2014 | Odom | |
| 11,295,322 B1 | 4/2022 | Yien et al. | |
| 2008/0162302 A1 | 7/2008 | Sundaresan et al. | |
| 2010/0179857 A1 | 7/2010 | Kalaboukis et al. | |
| 2010/0198641 A1 | 8/2010 | Wilson et al. | |
| 2015/0006328 A1 | 1/2015 | Yoon et al. | |
| 2015/0073929 A1* | 3/2015 | Psota et al. ........ | G06Q 30/0605 705/26.2 |
| 2016/0162913 A1 | 6/2016 | Linden et al. | |
| 2018/0285465 A1* | 10/2018 | Schaffernoth et al. . | G06F 16/29 |
| 2020/0104765 A1 | 4/2020 | Desai et al. | |
| 2022/0398608 A1 | 12/2022 | Yien et al. | |

OTHER PUBLICATIONS

Final Office Action mailed Jul. 23, 2021, for U.S. Appl. No. 16/248,471, of Yien, K., et al., filed Jan. 15, 2019.
First Action Interview Office Action mailed May 18, 2021, for U.S. Appl. No. 16/248,471, of Yien, K., et al., filed Jan. 15, 2019.
Georgantis et al., "A Review and Evaluation of Platforms and Tools for building e-Catalogs" Proceedings of the 35th Hawaii International Conference on System Sciences, (2002), pp. 1-10.
Georgantis et al., "A Review and Evaluation of Platforms and Tools for building e-Catalogs" Proceedings of the 35th Hawaii International Conference on System Sciences, (2002), pp. 1-10 (Year: 2002).*
Notice of Allowance mailed Nov. 29, 2021, for U.S. Appl. No. 16/248,471, of Yien, K., et al., filed Jan. 15, 2019.
Pre-Interview First Office Action mailed Mar. 19, 2021, for U.S. Appl. No. 16/248,471, of Yien, K., et al., filed Jan. 15, 2019.

* cited by examiner

*Primary Examiner* — Matthew E Zimmerman
(74) *Attorney, Agent, or Firm* — Lee & Hayes, P.C.

(57) ABSTRACT

An e-commerce service is configured to interface between merchants and vendors so that a merchant can purchase from vendors without having to communicate directly with the vendors. A recommendation service is also provided to provide recommendations to merchants regarding which of multiple available vendors to use for any given product. The recommendation service bases its recommendations on historical order data that has been archived by the e-commerce service, as well as on known or derived merchant properties. The recommendation service may also recommend rates at which an item should be ordered, based on ordering rates of other merchants.

18 Claims, 9 Drawing Sheets

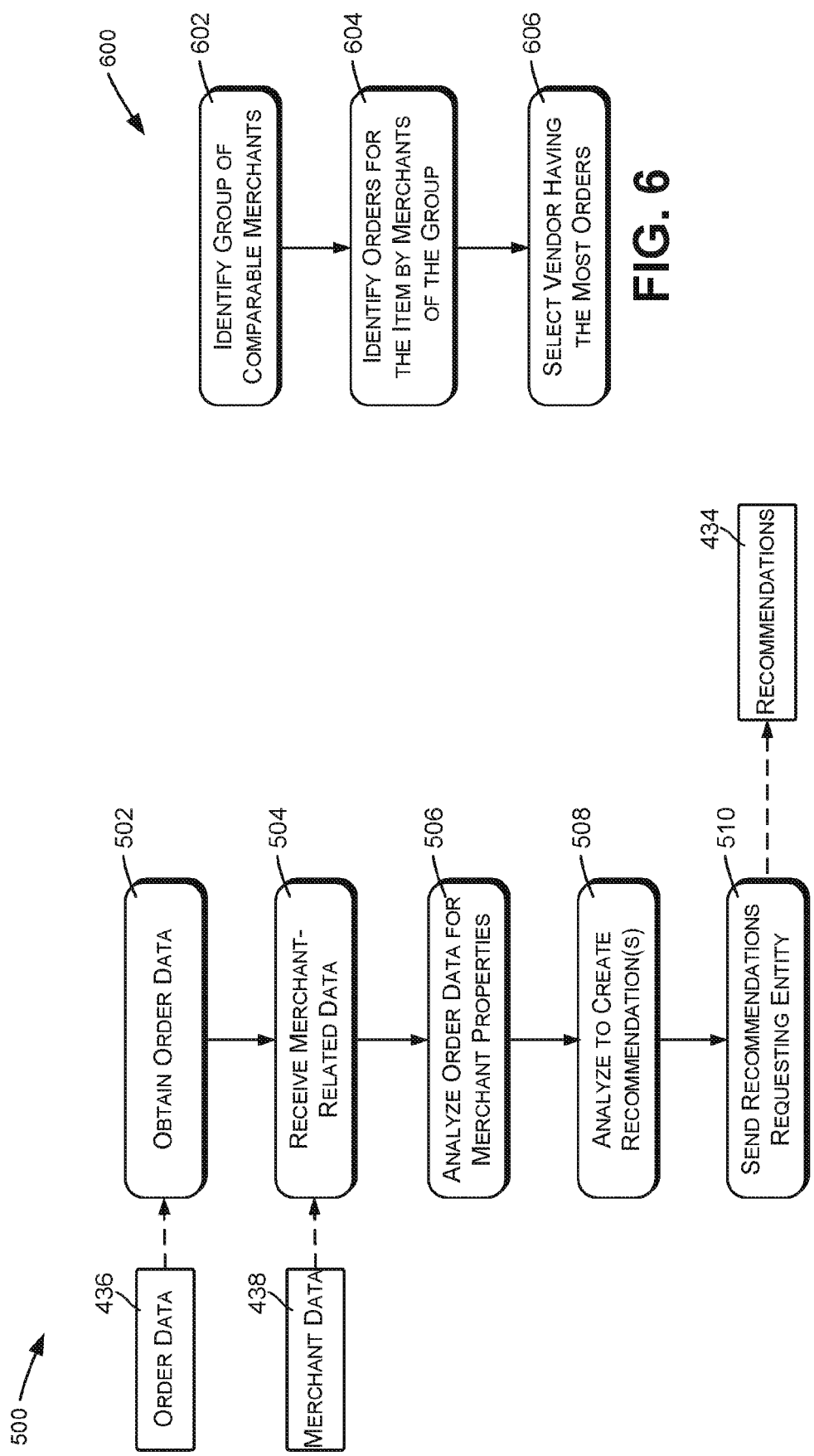

APPLICATION PROGRAM INTERFACES FOR VENDOR RECOMMENDATIONS

BACKGROUND

Buyers often use websites and other technologies to purchase items from merchants for delivery to the buyers. In some instances, an order and delivery system or service may facilitate deliveries of goods and services offered by a merchant. For example, an order and delivery service may provide an online site that identifies items from multiple merchants that are available for delivery. A buyer may navigate to the online site, select an item from a merchant, specify an address for delivery, and purchase the item for delivery to the buyer's address. The order and delivery service may utilize various technologies to fulfill ordering and delivery of the item to the buyer.

A merchant may subscribe to the services of multiple order and delivery services and may publish items with each of the services. However, the merchant has to manually control and coordinate the information provided to and received from these different services, each of which may use different interfaces and communication protocols. Because of this, the simplicity of operation promised by the order and delivery services is rendered useless. Further, the association of the merchant's interface with third-party services, such as the order and delivery services, may disrupt other technologies that are employed by the merchant to run their business(es).

Similarly, merchants may place orders with various third-party vendors to obtain items that are used or sold by the merchants. Again, however, the merchant has to first decide which third-party vendors to use and then has to manually interact with websites of the vendors to place orders. This can become cumbersome when dealing with multiple vendors.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIGS. 5-9 illustrate example methods that may be implemented to provide recommendations regarding third-party vendor services.

DETAILED DESCRIPTION

Figure 1:
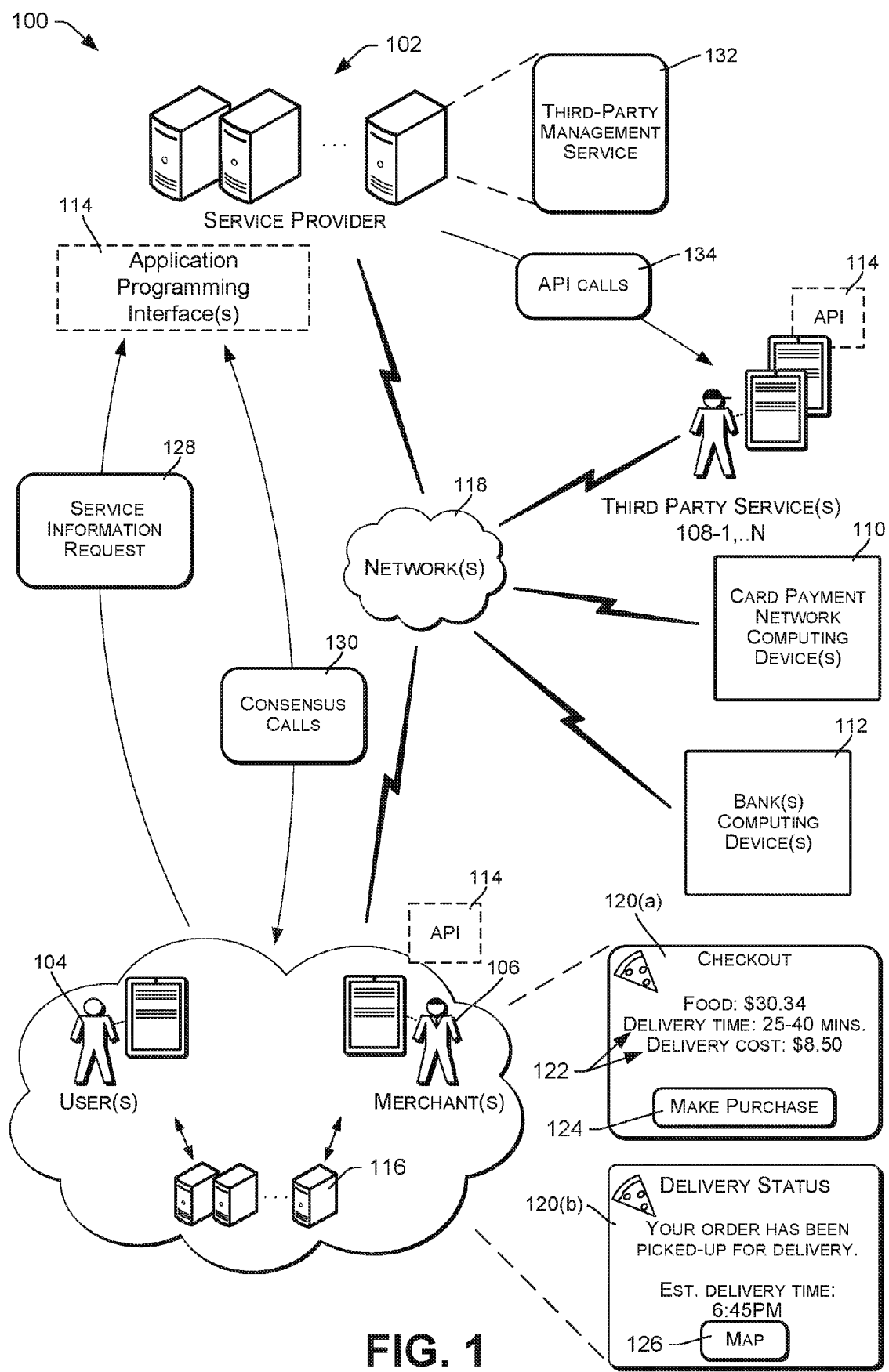
FIG. 1 is a block diagram illustrating an example architecture in which the techniques discussed herein may be implemented.

The technology described herein provides a system and environment that enable business entities to onboard, manage, and coordinate with different third-party systems and services, such as online order and delivery services, vendors, online reservation services, inventory services, accounting services, payroll services, transaction services, and so on, via a common service provider, such that the entities can optimize their uses of different third-party services. More specifically, a recommendation service is provided for making recommendations to a merchant device/application regarding third-party services. For example, the system may recommend which of multiple third-party order and delivery services should be used for delivering products, for online listings of product catalogs, as well as for recommending items to be offered within the product catalogs. As another example, the system may recommend which of multiple third-party vendors to use for fulfilling inventory items, at what rate (i.e., frequency and amount) the items should be ordered, and so on. Recommendations such as this may be based on past selections and activities of other merchants as well as on inventory activities of other merchants. In another example, the system may recommend a combination of order and delivery services, and other third-party services, based on merchant preferences or attributes such as location, time of operation, size of business, and the like.

In other implementations, the system may recommend that a merchant change its existing third-party services, based on the system's determination of a better alternative. In some implementations, this may involve replacing one service with another that is likely to provide better results for the merchant. In other implementations, the system may recommend that a merchant onboard a new or a new type of service to augment existing services. In some cases, the system may recommend throttling certain services. In some situations, the system may recommend a combination of services, based on the system's determination that the current service, or a single service, is not sufficient. Further, the system can control or "throttle" the access to a specific third-party service. The throttling can be static or dynamic, such as based on time of the day, specific use case, merchant location, and so on.

In some cases, recommendations regarding third-party services may vary depending on merchant location. In the case of mobile merchants, recommendations may vary as the merchant moves from one location to another. Other recommendations, such as payroll recommendations, may remain constant regardless of location.

As another example, the system may recommend shifting orders from one service to another based on relative performances of the two services. As another example, the system may recommend consolidating different services with a single service provider.

The system generates recommendations by analyzing merchant or customer data and/or merchant or customer preferences to determine, for example, historical selections and choices of comparable merchants. Recommendations may also be based on inventory activities and information, such as quantities ordered, quantities returned, inventory amounts, expiration, etc. In some cases, machine learning techniques may be applied to current and historical data to generate recommendations.

Comparable merchants can be identified by comparing their properties, such as their geographic locations, their sizes, their cash flows, their business types, their product offerings, and so forth. The properties can be obtained from different sources, including the merchant, applications and services used by the merchant, applications and services that process orders and perform other services for multiple merchants, applications and services that process orders for multiple order and delivery services, ecommerce platforms that list products from multiple sellers, and/or other sources. After identifying comparable merchants, the data of these merchants is analyzed to determine the previous choices and behaviors of the merchants in similar circumstances and to recommend these same choices and behaviors to merchants that have requested recommendations.

In one implementation, the system implements a machine learning model by analyzing training data, such as historical data, current order data, etc., to predictively determine a recommendation for the merchant. The system can also use machine learning models, pattern recognition models, and the like, to create heuristic rules that can be implemented to determine an accurate and favorable choice of service for the merchant, or other comparable merchants. Such models can also be used to identify another merchant or a cluster of merchants that are comparable to the merchant.

In a described embodiment, an online service provider may provide an order management service as an online service for use by various merchants in managing their use of multiple third-party order and delivery services. A merchant can use a computer, handheld device, or other device to access the order management service for creating and managing catalogs and for submitting catalogs to one or more order and delivery services. For example, a restaurant may submit a menu to the order management service and may instruct the order management service to provide the menu to a specified order and delivery service for publishing by the order and delivery service.

The order management service may provide order aggregation services by receiving orders from various third-party order and delivery services and forwarding the orders to the appropriate merchants. For example, consider a scenario in which a restaurant uses the order management service to provide a menu to multiple order and delivery services. To accomplish this, the order management service communicates with the order and delivery services to set up accounts on behalf of the restaurant. The accounts are set up to send orders back to the order management service, rather than to the restaurant. The order management service then communicates with the order and delivery services to provide one or more menus of the restaurant. As the order and delivery service receives orders from these menus, the orders are provided to the order management service, which then forwards the orders to the restaurant.

The order management service may receive orders from the menus of multiple restaurants. As the order and delivery service receives these orders, the order management service analyzes the orders as per rules, such as routing rules, etc., and intelligently forwards the orders to the appropriate restaurants, or restaurants that may have signed up with the order management service.

An order management service such as this allows a merchant to utilize multiple order and delivery services without the need to communicate or interface directly with each of the order and delivery services. Rather, in-house software of the merchant (i.e., specialized or customized software designed to address operational needs of the merchant) can be designed to communicate with the order management service, which in turn interfaces with the multiple order and delivery services on behalf of the merchant. This can greatly reduce the amount and complexity of developing the merchant's in-house software, because the software only needs to communicate with the order management service rather than the multiple order and delivery services.

In certain embodiments, an online service provider might provide an e-commerce platform as an online service for use by merchants and third-party vendors. For example, third-party vendors may provide catalogs or product listings to the e-commerce platform for publishing by the e-commerce platform. Merchants may then order inventory items from the vendors through the e-commerce platform, without needing to communicate directly with the vendors or with the vendors' computer systems. Again, this can reduce the amount and complexity of in-house software development, because the software only needs to communicate with the e-commerce platform rather than the various computer systems of multiple vendors. Through the implementations described herein, the third-party systems need not have the technical infrastructure to interface with other third-party systems. It should be noted that the systems described here can interface with multiple third parties regardless of how disparate and distinct the third- party systems may be. The systems can dynamically switch between communication protocols to allow communication between such distinct third- party systems.

In addition to the services described above, a merchant may use various other types of online services. For example, a restaurant may use an online operations management service to manage menus, orders, seating, reservations, front-of-house operations, back-of-house operations, shifts, personnel, payroll, etc. A restaurant may also use online payment processing services for processing payment transactions, including credit card and debit card transactions. In some cases, a restaurant may also use an online inventory service to keep track of food inventories. A restaurant may also use an online service to order inventory items from different vendors.

An online service provider such as described above may also provide a recommendation service for use by the merchants. The recommendation service may receive historical order data from the ecommerce platform, analyze the historical order data, and provide a recommendation for a merchant based on the analysis of the data, such as historical order data, future desired data, or even preferences submitted by the merchant or customer. As one example, the recommendation service may recommend a particular order and delivery service that should be used by a particular merchant. As another example, the recommendation service may recommend product items that the merchant should list with the recommended order and delivery service. As another example, the recommendation service may recommend a particular vendor or a set of vendors to supply inventory needs of a merchant. As yet another example, the recommendation service may recommend specific order and delivery actions, such as ordering a particular item, ordering inventory items at a specified rate, ordering a particular item from a specific vendor, ordering a quantity of the items, and so on.

The historical order data may specify information relating to orders placed or received by multiple merchants of various types. Historical order data may indicate information such as times at which orders were placed, items that were included in the orders, the order and delivery services that processed the orders, and vendors that fulfilled the orders, and so on. The information may be categorized by geographic location, time of day/week/month/year, types of items, and/or other properties.

Recommendations may be based on the historical order data as well as on information that relates more generally to the merchants associated with the historical order data. More specifically, catalog recommendations can be made by analyzing the historical order data in light of the characteristics and available products of the requesting merchant to identify catalog items of the requesting merchant that are most likely to be in demand and to identify which of multiple order and delivery services is likely to provide the greatest sales of the identified catalog items. Similarly, vendor recommendations can be made by analyzing the historical order data in light of the characteristics and available products of the requesting merchant to identify vendors that are preferred by comparable merchants in the same or similar circumstances. In some cases, the recommendations may relate to business decisions, such as recommendations of where the merchant should open a new location, which locations among the available locations the merchant should focus on more, and so on. The recommendations can also relate to inventory management, such as stocking of more or specific items at one merchant location versus another. The recommendations can also relate to whether to use a plurality of third-party services, and further which third-party service to use at what time or location. The recommendation engine can also be leveraged to fill the technical gaps in the third-party system's infrastructure. For example, the recommendation engine can recommend a payroll or inventory system based on detection that either the merchant lacks an inventory system, or the existing system is deficient.

The recommendations can be provided to the merchant, which can choose to accept the recommendations, to accept some of the recommendations, or to reject the recommendations. The recommendations can also be provided to the merchant, to invite user inputs, based on which the recommendations may be customized or further refined.

In some embodiments, the order management service may receive catalog recommendations generated by the recommendation service and may use the recommendations to automatically and dynamically configure a merchant's online offerings. Upon receiving recommendations for a restaurant, for example, the order management service may communicate with a recommended order and delivery service to specify that the recommended menu items be published by the recommended order and delivery service.

In some cases, recommendations may be updated periodically and provided to a requesting merchant. In response to an updated recommendation, the order management service may implement the recommendation by communicating with the appropriate order and delivery services to cancel previous listings and/or to provide new listings. In some cases, this may happen automatically, without specific merchant approval of each recommendation.

Advantages of a catalog recommendation service such as described above include better management of catalogs, as well as the ability to offer menu items that are most likely to be in demand in the geographic region of a merchant. The menu recommendation system also allows the merchant to determine the one or more order and delivery services that will be the most effective, given the type of products sold by the merchant, the geographic location of the merchant, and other factors. The recommendation service can be used to automate the placement of catalogs with different order and delivery services, so that direct supervision by the merchant is not necessary. In addition, the recommendation service may be configured to dynamically update menu items, and the order and delivery services that publish the menu items, in order to optimize sales at different times of day, week, month, or year. Further advantages include the ability to determine recommendations based on order data for many merchants and multiple order and delivery services, rather than strictly on the experiences or intuition of a merchant. That is, techniques described herein leverage access to data that is not available to conventional techniques to make intelligent recommendations for improving the utilization of different order and delivery services.

Advantages of a vendor recommendation service such as described above include the ability to select merchants that are the most efficient, have the lowest cost, and/or have the best service, based on, for example, the historical selections by other comparable merchants, or as per machine learning models. The efficiency can be time or resource based and, accordingly, the vendor recommendations can dynamically change with time or as resources change. Further advantages include the ability for a merchant to optimize ordering rates for given products. That is, techniques described herein leverage access to data that is not available to conventional techniques to make intelligent recommendations for improving the selection of different vendors as well as improving the ability of a merchant to forecast the rates at which products should be ordered. Advantages also include the use of data from various merchants and vendors to make intelligent recommendations for merchants to change their selections of different vendors for various products, to consolidate vendors, throttle vendors, etc.

Although certain embodiments are described herein as having or using functionality provided by online services, in other embodiments the same or similar functionality may be provided by software applications installed by the merchant on computing equipment associated with or used by the merchant such as desktop computers, local or remote servers, smartphones, tablet computers, registers, terminals, and/or other devices.

This brief introduction has been provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 illustrates an example architecture 100 in which the techniques discussed herein may be implemented. The architecture 100 includes a service provider 102 that communicates with one or more users 104 (hereinafter "the user 104") of applications such as a third-party management service, buyers at merchant locations, and so on, one or more merchants 106 (hereinafter "the merchant 106"), one or more third-party services 108 (hereinafter "an order and delivery service 108," "a courier service 108," "a reservation service 108," a "catalog service," an "inventory service", an "ecommerce service", "a content service," etc., depending on the context, and collectively referred to as third-party services), one or more card payment network computing devices 110, and/or one or more bank computing devices 112 to perform a variety of processing. The third-party services 108 may include services offered by the service provider 102, for example for delivery, reservation, recommendations, inventory, content analysis or content aggregation, and management. In some instances, the service provider 102 may provide one or more Application Programming Interfaces (APIs) 114 to enable the user 104 and/or the merchant 106 to access the services provided by the service provider 102. An API can be implemented as a Push API, Pull API or a combination of both. Accordingly, each of the applications can create or share API endpoints to receive or send updates or both. For example, the Push API enables sending of a push message to a web application a push service, sometimes asynchronously. An application server can send a push message at any time, even when a web application or user agent is inactive. The push service ensures reliable and efficient delivery to the user agent. Push messages are delivered to a service worker that runs in the origin of the web application, which can use the information in the message to update local state or display a notification to the user. The Pull API works on extracting data, for example based on scheduled jobs set to run at an interval. The Pull API keeps polling the source until certain conditions are met.

In some examples, information regarding APIs may be included in software development kit (SDK) information provided to developers of software-based tools and applications for merchants and vendors. The SDK information may include software tools to assist the developer in generating or updating a merchant application or a vendor application that is executable by a device of the merchant or vendor for performing the functions described herein, such as receiving custom information that causes a user interface presented on the merchant or vendor device to be modified.

Further, in some instances the service provider 102 may facilitate transactions between buyers (a first user) and sellers (a second user), which may include communicating with the one or more card payment network computing devices 110 and/or the one or more bank computing devices 112. Each of the user 104, the merchant 106, and/or the third-party services 108 may be associated with a computing device. For example, the third-party service 108 may be executing on a user device associated with the user 104 or on a device of the merchant 106. Further, in some instances the architecture 100 includes an additional service provider (service provider 116) to communicate with the user 104 and/or the merchant 106 to facilitate the acquisition of an item. Any of the computing devices of the architecture 100 may communicate with each other via one or more networks 118, which may include various private and/or public networks, including the Internet.

A merchant may include any business or entity engaged in the offering of goods or services for acquisition by buyers in exchange for compensation received from the buyers. Actions attributed to a merchant may include actions performed by employees or other agents of the merchant and, thus, no distinction is made herein between merchants and their employees unless specifically discussed. Hereinafter, goods and/or services may be referred to as items or product items. An item may include a finished product, partially finished product, raw material, and so on. Thus, a merchant and a vendor may interact with each other to conduct a transaction in which the merchant acquires one or more items from a vendor, and in return, the merchant provides payment to the vendor.

A third-party service, such as an order and delivery service, may include any entity engaged in delivering an item. A third-party service may obtain an item from a delivery pick-up location (e.g., a location of a merchant) and transport the item to a delivery drop-off location (e.g., a location of a buyer). Some implementations herein provide technological innovations that enable merchants to harmonize delivery requests (also referred to as orders) coming in from different delivery portals. With such technology, the merchant is able to coordinate and synchronize orders in relation to inventory, time of order placement, the loyalty rating of the customer and so on.

An inventory service is another example of a third-party service. An inventory service may provide recommendations regarding inventory to merchants. For example, an inventory service may recommend items to be maintained in inventory, removed from inventory, and/or added to inventory. A vendor service is another example of a third-party service. A vendor service may be responsible for certain functions, such as providing inventory, supporting accounting services, offering payroll services, and so on. In some implementations, the services may utilize specialized hardware and/or software systems that are configured specifically for this purpose.

As noted above, the service provider 102 may expose the one or more APIs 114 of the third-party management service to enable a computing device associated with the user 104 and/or the merchant 106 to access, harmonize, normalize, refactor, reconcile, and/or interface with third-party services, such that the merchants or user processes are structured in an optimal manner.

For ease of description in the example of FIG. 1, the computing device associated with the user 104 and/or the merchant 106 will be referred to as "the acquisition device." In the example of FIG. 1, the acquisition device communicates with the service provider 102 through the one or more APIs 114 to facilitate an action, such as delivery of an item, seat reservation, and menu update. The acquisition device displays various information received from the service provider 102 regarding delivery of the item through an item acquisition user interface 120. In this example, an acquisition device executes a delivery service 108-1 for delivery of item, such as pizza, while a delivery service 108-2 for delivery of an item, such as a drink.

In some cases, the acquisition device may be different and the merchant may receive two separate delivery requests from different third-party services. While placing requests, the service provider, using a third-party management service 132, may determine order and timing of the orders that were received. The third-party management service 132, using for example machine learning models, determines when the orders should be placed, which items can be clubbed for preparation, and so on. In at least one example, a model can be trained via a machine learning mechanism. In such an example, the model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model can be trained on training data associated with a plurality of merchants. Inputs to the model may comprise order data and merchant data relating to an individual merchant. As output, the model may identify a third-party service that is most likely to be used by a merchant having characteristics and associated data that are like the individual merchant. The model can be trained using historical order data. Machine-trained models may be used in a like manner to determine most likely selections by a merchant of menu items and vendor items, and the rates at which a merchant is likely to order different product items. In some cases, training data may also include indications of similarities (e.g., similarity metrics) between merchants, in these cases, the machine-trained model can output a similarity metric indicating a similarity between two merchants, which can be based on merchant data associated with the two merchants.

The third-party management service 132 schedules the order for a kitchen display system (not shown) associated with the merchant. In this way, the merchant does not need to maintain multiple tablets corresponding to orders coming from different sources. A single tablet indicates the source of order, timing, estimated time of delivery, and a new order of preparation, for example based on timing of orders, source, location, time of preparation etc. Similarly, for reservation requests, the third-party management service 132 creates a single list of reservations and may also indicate how to distribute seating and reservations among users and merchants. Furthermore, the third-party management service may interface with the parties to communicate progress of requests in real-time or near real-time.

For example, the acquisition device may communicate with the merchants via the service provider 102 through the one or more APIs 114 while placing an order with the merchant 106. In particular, an individual (the user 104 and/or the merchant 106) may place an item in an online shopping cart for purchase and indicate an interest in having the item delivered. In response, the acquisition device may send a request to the service provider 102 via the one or more APIs 114 for information regarding delivery, reservation, or content management. The service provider 102 may communicate with the merchants or merchant inventory database (local or remote) to generate a delivery proposal regarding delivery of the item by delivery services associated with the service provider 102 and send the delivery proposal to the acquisition device. The acquisition device may display information of the delivery proposal via the item acquisition user interface 120(a) for acceptance or rejection. As illustrated in FIG. 1, an estimated amount of time to deliver the item and a delivery cost is presented at 122 in the acquisition user interface 120(a) of the acquisition device. The individual may accept the delivery proposal and cause the order to be placed by selecting a button 124 (e.g., a selectable control).

Further, the acquisition device may communicate with the service provider 102 via the one or more APIs 114 to obtain status updates regarding a delivery of the item ordered by another third-party service or another user. In such instances, the service provider 102 may monitor a location of a courier assigned to deliver the item (e.g., the third-party service 108), or obtain such information from a third-party service associated with the courier, obtain information from a merchant that is selling the item (e.g., the merchant 106), and/or obtain other information. The service provider 102 may determine a status of delivery of the item and send the status of delivery to the acquisition device. The status of delivery may be displayed via the item acquisition interface 120(b). The status may be determined and/or provided to the acquisition device upon request from the acquisition device (e.g., in response to a message sent through the one or more APIs 114), periodically, and/or upon the occurrence of another event. As illustrated in FIG. 1, the item acquisition interface 120(b) may include a button 126 (e.g., a selectable control) which, when selected, displays a map that shows a current location of the assigned third-party service device, a route traveled by the assigned third-party service device, a route yet to be taken by the assigned third-party service device to pick up or deliver the item, and so on.

In the example of FIG. 1, a delivery service information request 128 represents communications that are sent by the acquisition device to the service provider 102 via the one or more APIs 114, while delivery service information 130 represents communications sent back to the acquisition device from the service provider 102, such as consensus calls to indicate how orders are sequenced, how contemporaneous order requests are handled, fraudulent requests, the delivery times, the seating chart, and other information for a merchant to schedule and organize the operations. The delivery service information request 128 may include a request for information regarding delivery of an item (e.g., cost estimate, delivery time estimate, etc.), an indication of acceptance/rejection of a delivery proposal, a request for information regarding a delivery status, and so on. The delivery service information 130 may include a delivery proposal, information regarding a delivery status of an item, and so on.

In other embodiments or applications, an information request 128 may be sent to an inventory service to request recommendations regarding inventory. The inventory service may respond with inventory service information 130 that identifies items to add, remove, or maintain in inventory, vendors that should be used for different items, rates at which inventory items should be ordered, dates upon which inventory items should be ordered, and so forth.

As another example, a vendor service information request 128 may be sent to a vendor service to request recommendations regarding vendors to be use in fulfilling merchant needs. The vendor service may respond with vendor service information 130 that identifies vendors to be used, vendors to be replaced, vendors that should be throttled, relative amounts that each vendor should be utilized, and so forth.

In some instances, the acquisition device may operate in cooperation with the service provider 116. The service provider 116, and associated application such as a third-party management service, may provide resources that operate remotely and/or independently from the acquisition device and/or the service provider 102. In one example, the service provider 116 may be associated with the merchant 106 to manage purchases, inventory, and/or perform other processing. The service provider 116 may provide an online site, operate in cooperation with a local application on the acquisition device (e.g., desktop application, mobile application, etc.), and so on. To illustrate, the service provider 116 may provide an online website for a pizza restaurant and all the delivery services from where the customer can order, so that customers (and/or the pizza merchant) may place orders for pizza with the pizza merchant. As such, communications that are sent and/or received by the acquisition device to the service provider 102 may be routed through the service provider 116. In other words, the service provider 116 may act as an intermediary between the acquisition device and the service provider 102, and also between the merchant and third-party services. This kind of architecture allows data to be selectively and privately shared between parties such that only data relevant to the parties is revealed. The service provider 116 may communicate with the service provider 102 via the one or more APIs 114. This may provide a seamless integration of the delivery services offered by the service provider 102 into technologies associated with the merchant 106. In returning to the pizza restaurant illustration above, the website for the pizza restaurant may integrate the delivery services of the service provider 102 by communicating with the service provider 102 via the one or more APIs 114. In some instances, this may occur without the customer knowing that the pizza restaurant is using such delivery services (e.g., so that it appears that delivery is being provided by the merchant 106). In other instances, information may be communicated to the customer indicating that the delivery services are being provided by the service provider 102 (e.g., a pop-up window indicating that the pizza will be delivered by Company X). Although many functions are described as being performed by the service provider 116, any of these functions may be performed by the service provider 102.

The service provider 102 may additionally, or alternatively, perform processing to manage third-party services. For instance, the service provider 102 may communicate with the third-party service 108 to track a location of the third-party service 108, request delivery of an item, receive status information regarding a delivery (e.g., confirmation from the third-party service that an item was picked up or dropped off), and so on. In the example architecture 100, the service provider 102 receives an indication of acceptance of a delivery proposal or a recommendation proposal from the acquisition device and selects a third-party service to deliver the item. The service provider 102 may identify locations of multiple third-party services and select a third-party service (the third-party service 108 in this case) to transport the item to a delivery location. The service provider 102 may then send a delivery request to the third-party service 108 requesting delivery of the item and, in return, the third-party service 108 may send an indication of acceptance or rejection of the delivery request.

In some instances, the service provider 102 may cause payments to be made to any party within the architecture 100. For example, the service provider 102 may cause funds from an account associated with the user 104 to be transferred to an account associated with the merchant 106 as payment for an item. Further, funds may be transferred from an account associated with the service provider 102, the merchant 106, and/or the user 104 to an account associated with the third-party service 108 for delivering the item. Payment may additionally be made to the service provider 102 for facilitating the transaction.

As noted above, the service provider 102 may communicate with the one or more card payment network computing devices 110 to conduct a transaction electronically. The one or more card payment network computing devices 110 may be associated with a card payment network (e.g., MasterCard®, VISA®, etc.). The service provider 102 may also communicate with the one or more bank computing devices 112 of one or more banks. For example, the service provider 102 may communicate with an acquiring bank, an issuing bank, and/or a bank maintaining user accounts for electronic payments.

An acquiring bank may be a registered member of a card association (e.g., Visa®, MasterCard®, etc.), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in a card payment network and may communicate with the computing devices of a card-issuing bank to obtain payment. Further, in some examples, a user may use a debit card instead of a credit card, in which case, the bank computing device(s) of a bank corresponding to the debit card may receive communications regarding a transaction in which the user is participating. Additionally, there may be computing devices of other financial institutions involved in some types of transactions or in alternative system architectures, and thus, the foregoing are merely several examples for discussion purposes.

The one or more card payment network computing devices 110 and/or the one or more bank computing devices 112 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

As noted above, the computing devices of the architecture 100 may communicate via the one or more networks 118. The one or more networks 118 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 118 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the architecture 100 may communicatively couple to the one or more networks 118 in any manner, such as by a wired or wireless connection.

The techniques discussed herein may be implemented in a variety of contexts and/or in a variety of manners. As one example, the techniques may be implemented with a merchant-facing component (e.g., application, online site, interface, etc. designed for a merchant). In this example, the merchant 106 may place an order for a customer. In particular, the customer may enter an establishment of the merchant 106, place a telephone call with the merchant 106, send a notification to the merchant 106 (e.g., email, text message, social media post, etc.), or otherwise communicate with the merchant 106. The merchant 106 may interact with the merchant-facing component (e.g., the item acquisition interface 120 designed for merchant use) to select an item identified by the customer and/or input other information provided by the customer (e.g., a delivery address, etc.). When a delivery proposal is received from the service provider 102, the merchant 106 may communicate the information of the delivery proposal to the customer (e.g., display a screen with a delivery cost, read the delivery cost from the item acquisition interface 120 to the customer, send a notification, etc.). Alternatively, the merchant 106 may refrain from providing the information of the delivery proposal to the customer. For instance, the merchant 106 may decide to offer the delivery for free to the customer, include the cost of delivery in a total cost of the order (e.g., without being itemized), and so on. In any event, the merchant 106 may accept or reject the delivery proposal and/or order the item based on a communication from the customer.

As another example, the techniques may be implemented with a customer-facing component (e.g., application, online site, interface, etc. designed for a customer). In this example, a customer may place an order directly with the merchant 106. In particular, the customer may navigate to an online site associated with the merchant 106, open an application associated with the merchant 106 (e.g., desktop application, mobile application, etc.), and so on, to place an order with the merchant 106. In some instances, the customer may view delivery information during the process (e.g., a delivery cost, estimated amount of time for delivery, etc.), while in other instances the information may not be shown to the customer or included within other information (e.g., a total cost of the order). Further, the customer may view a status update of a delivery through the customer-facing component.

As yet another example, the techniques may be implemented automatically, without user input. In this example, information may not be displayed or otherwise communicated to an individual. For instance, one or more criteria may be established for acceptance/rejection of a delivery proposal, so that the delivery proposal is automatically accepted/rejected upon satisfying the one or more criteria. To illustrate, a delivery proposal may be accepted (or rejected) if a cost for delivery is below (or above) a threshold cost, an estimated amount of time of delivery is below (or above) a threshold amount of time, an estimated pick-up time for delivery is before (or after) a particular time, an estimated drop-off time for delivery is before (or after) a particular time, and so on. As such, in some instances, information regarding a delivery may not be displayed through the item acquisition interface 120.

Similarly, for the case of reservations, the reservation requests, via API calls, may be initiated by the merchant through merchant devices, customer through customer devices, the third-party devices through settings made by the merchant or customer, or automatically through the third-party management service, based on machine learning of transactions between merchant and customers.

For content aggregation and analysis, the content harmonization requests, such as pushing customized menus or harmonizing menus across different services, the content requests, via API calls, may be initiated by the merchant through merchant devices, customer through customer devices, the third-party devices through settings made by the merchant or customer, or automatically through the third-party management service, based on machine learning of transactions between merchant and customers.

Similarly, inventory requests for certain vendors may be made using devices associated with the merchants, through settings made by merchants, or automatically based on recommendations made by the third-party management service based on machine learning of historical purchases by merchants from vendors.

Figure 2:
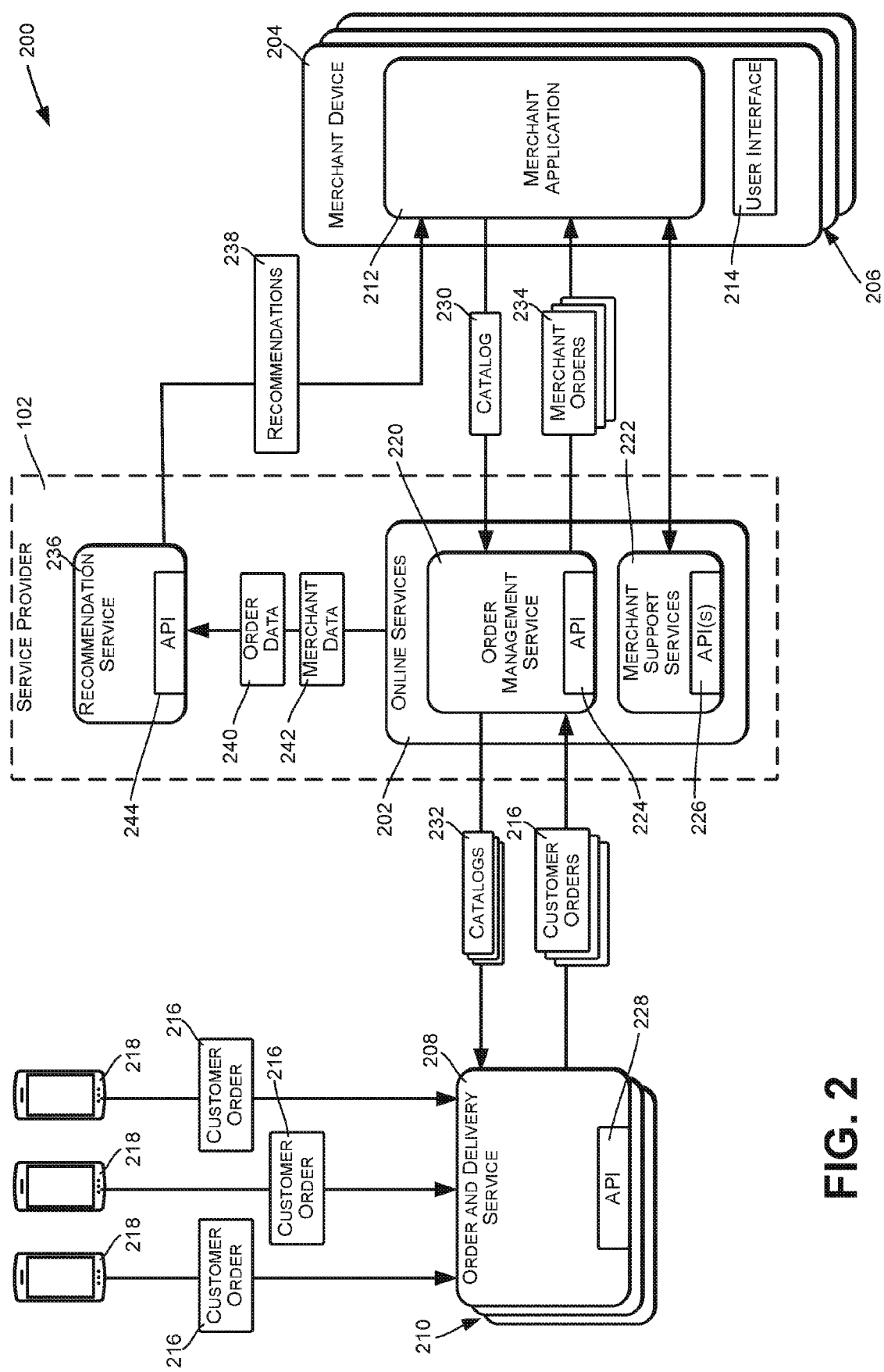
FIG. 2 is a block diagram illustrating an example architecture that may be implemented to provide recommendations regarding third-party order and delivery services.

FIG. 2 shows an example architecture 200 that may be implemented in accordance with certain of the techniques described above, such as the techniques described with reference to FIG. 1.

The architecture 200 includes online services 202 that are provided by the service provider 102 for the use of merchants. Merchants may include manufacturers, distributors, wholesalers, vendors, resellers, retailers, buyers, suppliers, etc. Interactions attributed to a merchant or other business entity are understood to include interactions with a human operator or member of the business entity or a person acting on behalf of the business entity. Interactions may also be with automated systems of the business entity.

The online services 202 may be implemented as a large-scale, network-based service that supports many merchants, who may be distributed across large geographic areas and may operate from or within numerous respective business establishments. In some cases, the online services 202 may be available to merchants and consumers through pages of a website that are accessed by computing devices of merchants and consumers, such as by computers, tablet computers, smartphones, or other devices that run an Internet browser or other graphical interface for accessing the website pages. In other cases, the online services 202 may expose network-accessible application programming interfaces (APIs) or other network-based interfaces that are accessible by special-purpose client software that runs on computing devices of the merchants and/or consumers.

In the described embodiments, the online services 202 may be implemented by multiple server computers, which may include physical computers and virtual computers, and by software that is executed by the server computers. As one example, such server computers may be part of one or more computing centers, server farms or server clusters that are operated by the service provider 102 and that include large numbers of server devices, each of which may be capable of implementing multiple virtual server instances. Responsibility for the functionality described herein may be distributed and duplicated across the multiple servers and/or virtual server instances. In other embodiments, the functionality described herein may be provided at least in part by other components, including computing devices of the merchants, which may comprise point-of-sale (POS) terminals and/or other devices that provide various types of POS and business management functionality.

Generally, merchants use computer terminals of some sort to interact with the online services 202. Examples of suitable computer terminals include desktop computers, tablet computers, smartphones, various other types of portable devices, and/or dedicated or special-purpose devices having appropriate user input/output (I/O) capabilities such as keypads, touchpads, audio/voice interfaces, and/or graphics displays. Such computer terminals may also have scanners or other types of sensors for detecting things such as barcodes, radio-frequency identification (RFID) tags, and other tokens that identify physical product items. The computer terminals may also have scanners, readers, or other sensors for obtaining customer payment information. For example, the computers may include magnetic card readers, radio-frequency identification (RFID) readers, near-field communication (NFC) readers/writers, etc. In some cases, computer terminals used by business entities and supported by the online services 202 may enable mobile payments, such by allowing a retail customer to use a smartphone or other mobile device to pay for a purchase.

In the architecture 200, a terminal referred to as a merchant device 204 is associated with and operated by a merchant, such as the merchant 106 of FIG. 1. The merchant device 204 is one of multiple merchant devices 206, which are associated with respective different merchants 106. In some cases, the merchant device 204 may comprise a dedicated, physical point-of-sale device. For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, EINs, lines of business (in some examples), inventories (or at least portions thereof) and/or the like. That is, the use of the term "different merchants" does not refer to a single merchant having multiple merchant locations or franchise/franchisee relationships.

FIG. 2 also shows an order and delivery service 208 as an example of a third-party service 108 that is used to facilitate product sales to customers by merchants. The order and delivery service 208 is one of multiple order and delivery services 210 that are available for use by merchants.

Operations and communications of the merchant device 204 and the order and delivery service 208 are described herein as being representative of operations and communications that might be performed by any of the multiple merchant devices 206 and any of the order and delivery services 210.

In practice, each merchant may use multiple computer terminals of various types. In some cases, different computer terminals and/or types of computer terminals may be used for different purposes within a business entity, such as for inventory management, catalog management, pricing management, purchasing, and POS functionality. In other cases, a single device, such as a single POS device, may be used for all of this functionality.

The online services 202 may be implemented as Internet-based services. Communications between the various entities of the architecture 200 may be through one or more wide-area communication networks, such as the networks 118, which may include the Internet. In cases where one or more of the illustrated entities are provided by a single service provider, certain communications may be through private networks of the service provider.

In some embodiments, each of the merchant devices 206 may have a merchant application 212 that is executed to generate a graphical user interface (GUI) 214 that acts as an interface between the online services 202 and users of the merchant devices 206. The GUI 214 may be configured to interact with a user to accept and display various types of information that is used and/or provided by the online services 202. For example, the merchant may use the GUI 214 to enter and configure catalogs, to select order and delivery services that are to receive the catalogs, to receive and process customer orders, and to perform other catalog and order management functions.

In embodiments in which the online services 202 implement an Internet website for access by merchants and/or consumers, the merchant application 212 may comprise an Internet browser that is used to access the Internet website.

The order and delivery service 208 receives customer orders 216 from multiple customer devices 218. The customer devices 218 are associated with respective customers, such as the users 104 of FIG. 1, who use the devices 218 to place orders through the order and delivery service 208.

The order and delivery service 208 may comprise a network-accessible service, also referred to as an online or Internet service, that is designed for use by merchants to list and sell their products. As an example, the order and delivery service 208 may be designed for food ordering and delivery and the merchant may be a restaurant that provides menus of food items for publishing by the order and delivery service 208.

In use, a merchant uses the merchant device 204 to provide a list of catalog items and corresponding prices to be published on a public website of the order and delivery service 208. The order and delivery service 208 may receive and publish catalogs from any one or more of the multiple merchant devices 206. The term "publish" refers to making the catalogs available for access and use by one or more entities.

The order and delivery service 208, through its website, displays catalogs from the multiple merchant devices 204 and accepts orders from customers for items that have been published by the order and delivery service 208 on behalf of the associated merchants. Upon receiving an order for one or more items of a particular merchant, the order and delivery service 208 sends the order to that merchant for fulfillment. The order and delivery service 208 may then arrange for delivery of the ordered items to the purchasing customers.

In the architecture 200, the online services 202 may include an order management service 220 as an example of a third-party management service that acts on behalf of a merchant to provide catalogs to and receive orders from the order and delivery service 208. The merchant device 204 communicates with the order management service 220 in order to specify catalogs to be published by designated ones of the order and delivery services 210 and to receive the customer orders 216.

The order management service 220 may in some embodiments comprise instances of an order management application that are executed by multiple network servers of the service provider 102.

The online services 202 may also include various merchant support services 222, which may include services for various merchant activities such as accounting, inventory, operations management, payroll, employee scheduling, reservations management, and so forth. The merchant support services 222 may in some cases be further examples of the third-party services 108 of FIG. 1.

One or more of the entities of the architecture 200 may implement network application programming interfaces (APIs) that can be accessed by other entities for communications. The network APIs can be implemented, for example, as Representational State Transfer (REST) web services, which are sometimes referred to as RESTful web services. As another example, the network APIs can be implemented as Simple Object Access Protocol (SOAP) web services.

Each network API allows a computing entity to communicate with a network-accessible service, such as an online Internet service, to access resources of the service. A network API typically defines various types of calls that the computing entity can make to the network-accessible service, where each call invokes a function, requests information and/or provides information. A network API may in some cases comprise a bi-directional or push-pull API, which means that either of two communicating entities can initiate communications. In other cases, a network API may be unidirectional, where communications with the network-accessible service are initiated by an accessing entity.

In the illustrated embodiment, the order management service 220 has a network API 224, referred to herein as an order management API 224, that is accessed by the merchant devices 206 to utilize the order management service 220. The merchant device 204 can communicate with the order management service 220 through the order management API 224 to create and modify product catalogs, to specify which of the order and delivery services 210 should be used to publish each of the catalogs, and to obtain orders from the order management service 220. In some embodiments, the merchant device 204 may poll the order management API 224 to detect new orders. In other embodiments, the order management API 224 may provide callback functions so that new orders can be pushed to the merchant device 204.

The order management API 224 may in some embodiments be part of the API 114 (FIG. 1) of the service provider 102. That is, the API 224 may support a subset of the functionality that is more broadly supported by the API 114.

The merchant support services 222 may also have one or more APIs 226 through which the merchant devices 206 communicate in order to use the merchant support services 222.

In some embodiments, the order management service 220 and the various merchant support services 222 may be provided by the service provider 102 as shown in FIG. 2. In other embodiments, any of the order management service 220 and the merchant support services 222 may be provided by entities other than the service provider 102. In some cases, certain functionality described herein may be performed by the merchant device 204 and/or the merchant application 212 rather than by the service provider 102.

In a described embodiment, the merchant device 204 communicates through the order management API 224 to send a catalog 230 to the order management service 220, along with a designation of one or more of the order and delivery services 210 that are to publish the catalog 230. In the example of FIG. 1, it is assumed that the merchant device 204 has designated that the catalog 230 be published by the order and delivery service 208.

The order management service 220 may receive multiple catalogs from the merchant device 204 and may receive one or more catalogs from each of the multiple merchant devices 206.

The order management service 220 communicates through an order placement API 228 of the order and delivery service 208 to send multiple catalogs 232 to the order and delivery service 208. The multiple catalogs 232 include the catalog 230 from the merchant device 204, as well as other catalogs, from any of the multiple merchant devices 206, that have been designated for publishing by the order and delivery service 208.

The order and delivery service 208 publishes the catalogs 232 on a publicly accessible website through which customers can place the customer orders 216 for individual items of the catalogs 232. The order management service 220 then obtains the orders 216 from the order and delivery service 208, via the network API 228.

The order management service 220 may receive customer orders 216 from any of the multiple order and delivery services 210. Each of the received customer orders 216 specifies one or more items of a catalog of an individual merchant and is forwarded to the merchant device 204 associated with that merchant (e.g., via the service provider 102). In FIG. 1, the order management service 220 sends multiple merchant orders 234 to the merchant device 204. The merchant orders 234 may be from one or more of the multiple order and delivery services 210 and may be from multiple customers 112 of the multiple order and delivery services 210.

Upon receiving the merchant orders 234, the merchant device 204 alerts the associated merchant of the orders so that the merchant can fulfill the orders. For example, the merchant application 212 may display the orders and the items of the orders (e.g., via a corresponding GUI 214).

In a described embodiment, the service provider 102 implements a recommendation service 236 that provides menu recommendations 238 to a merchant via the merchant device 204. More specifically, the recommendation service 236 receives order data 240 from the order management service 220, analyzes the order data 240 to generate the recommendations 238, and provides the recommendations 238 to the merchant device 204 for presentation to the associated merchant using the GUI 214 of the merchant device 204. In some embodiments, the recommendation service 236 may also receive merchant data 242 from the online services 202, and the recommendations 238 may be based in part on the merchant data 242. The order data 240 and the merchant data 242 may be obtained using one or more APIs of the online services 202, such as the order management API 224 and the API(s) 226 of the merchant support services 222.

The merchant application 212 may be configured to present an option, such as an on-screen menu item or other control, for the merchant to request a menu recommendation. In response to selection of this option, the application 212 communicates with the recommendation service 236, through a network API 244 of the recommendation service, to request and receive the recommendation.

In other embodiments, the merchant application 212 may communicate with the order management service 220, through the order management API 224, to request and receive a recommendation. In these embodiments, the order management service 220 may be configured to accept a recommendation request from the merchant device 204, to communicate with the recommendation service 236 through the API 244 to obtain the requested recommendation, and to return the recommendation to the merchant device 204.

In some embodiments the recommendation service 236 and/or its functionality may be built into the order management service 220, and the order management service 220 may implement the functionality and actions that are attributed herein to the recommendation service 236. In other embodiments, the recommendation service 236 may be implemented as a third-party service, by an entity other than the service provider 102, and may obtain the order data 240 and merchant data 242 through APIs of the online services 202.

The recommendation service 236 generates recommendations by analyzing the historical order data 240 and the merchant data 242. Note that although the merchant data 242 is illustrated as being provided by the online services 202, certain merchant data may also be obtained from other sources. For example, any of the service provider 102, the order management service 220, the merchant support service 222, or any other accessible service or database may maintain and store merchant information, such as characteristics of the merchant, types of products provided by the merchant, the geographic location of the merchant, and other information. Furthermore, merchant information may in some cases be obtained by analyzing the order data 240.

In some embodiments, the merchant application 212 may support various merchant activities in addition to catalog and order processing. For example, the merchant application 212 may allow a merchant to define menu items, to designate selected menu items for catalogs, and to designate or identify an order and delivery service with which a designated catalog is to be published.

In the context of FIG. 2, the merchant application 212 may also provide an interface to the merchant support services 222 in order to support activities such as reservation management, operations management, inventory management, payment management, and so forth.

The merchant application 212 may perform various functions in addition to those mentioned above. For example, the application 212 may allow use of the merchant device 204 as a point-of-sale device, for use when accepting payments from customers. Specifically, the application 212 may facilitate credit/debit card transactions by reading payment information from credit/debit cards and communicating with various financial services to initiate charges to the credit cards and debit cards.

Other merchant activities supported by the merchant application 212 may include management of inventory, operations, personnel, shifts, payroll, accounting, reservations, seating, etc. In some cases, the merchant device 204 may utilize the online merchant support services 222, in addition to the order management service 220, to support these activities.

In other implementations, the merchant device 204 may use different applications to support different merchant activities.

Figure 3:
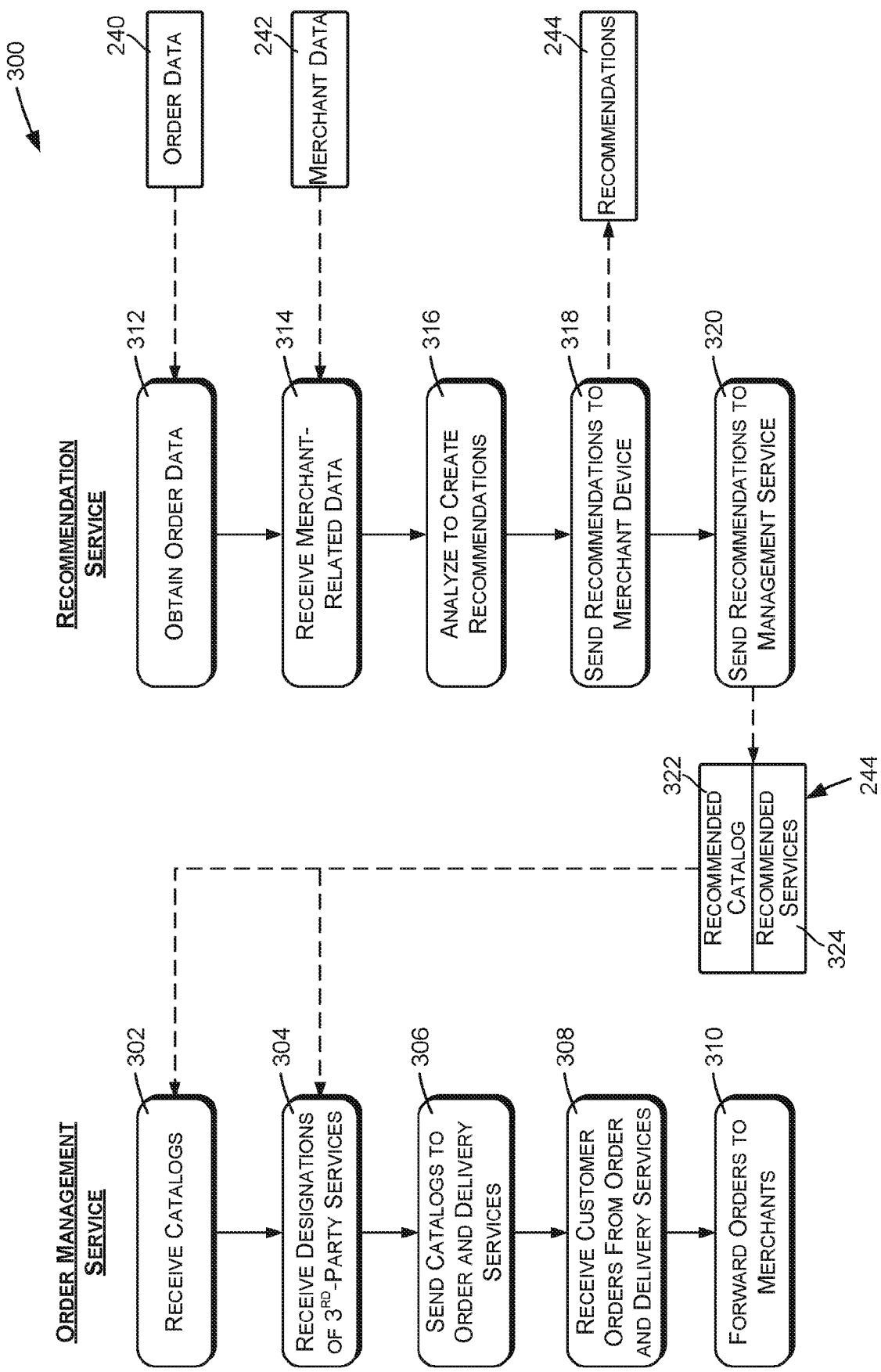
FIG. 3 is a flow diagram illustrating an example method that may be implemented to provide recommendations regarding third-party order and delivery services.

FIG. 3 illustrates an example method 300 of creating and managing catalogs to be published by one or more online order and delivery services. The method 300 will be described in the context of the architecture 200 of FIG. 2, although the method 300 may also be implemented in conjunction with other environments and configurations.

Actions on the left side of FIG. 3 may be performed by the order management service 220 and actions on the right side of FIG. 3 may be performed by the recommendation service 236. As described above, however, in some embodiments the recommendation service 236 may be implemented as part of the order management service 220. In these embodiments, the actions on the right side of FIG. 3 may also be performed by the order management service 220 and/or an order management application that implements the order management service 220.

Beginning with actions performed by the order management service 220, an action 302 comprises receiving catalogs from merchants for publishing with the order and delivery services 210. Each catalog specifies one or more items that are being offered for sale by a merchant. In a restaurant environment, for example, each catalog may be a menu of food items offered by a restauranteur.

In certain embodiments, the catalogs may be received from merchants via the merchant devices 204 and/or applications running on the merchant devices 204. In some cases, each merchant device 204 may have an instance of the merchant application 212, which may be referred to as an order fulfillment application 212. The order fulfillment application 212 communicates through the order management API 224 provide catalogs and other information to the order management service 220.

In other embodiments, a merchant might use an Internet browser to access the order management service 220. In these embodiments, the order management service 220 might implement a website that can be accessed by merchants to use the order management service 220.

An action 304 comprises receiving designations or identifications of third-party services, such as any of the order and delivery service 210, with which to publish the catalogs. In cases where the catalogs are received from merchant devices, these designations may also be specified by the merchants and may accompany the received catalogs. In some embodiments, catalogs and identifications of third-party services may be received from the recommendation service 236, as will be described in more detail below.

An action 306 comprises sending the received catalogs to their designated order and delivery services. In particular, the action 306 may comprise sending a catalog, provided by a merchant, to one or more of the order and delivery services 210 that have been selected and designated by the merchant. In the architecture 200 of FIG. 2, the action 306 may be performed by communicating with the order and delivery service 208 through its API 228. In response to receiving a catalog, the order and delivery service 208 publishes the catalog on its website for display by the customer devices 218.

An action 308, performed by the order management service 220, comprises receiving orders placed by customers through multiple network-accessible third-party services such as the order and delivery service 208. More specifically, the action 308 may comprise communicating with the order and delivery service 208 via its APIs 228 to receive orders placed by customers through the order and delivery service 208. Each order is for one or more items of a catalog that was previously provided by and received from a merchant.

An action 310 comprises forwarding or otherwise providing the orders to multiple merchant devices 206, for fulfillment by the associated merchants. In some embodiments, the action 310 may be performed via the order management API 224. In some embodiments, each merchant device 204 may have an instance of the merchant application 212 stored thereon that communicates through the order management API 224 to receive the orders from the order management service 220.

The actions of the order management service 220, described above, may be performed repetitively or continuously so that merchants can update their catalogs and receive orders at any time.

Turning now to actions performed by the recommendation service 236, an action 312 comprises obtaining the historical order data 240. In some cases, this may involve accessing databases maintained by the order management service 220. In other cases, the action 312 may comprise communicating through the API 224 of the order management service 220 to obtain the historical order data 246 for the order management service 220.

As examples, the historical order data may indicate one or more of:
items of historical orders;
prices of ordered items;
times at which the historical orders were placed, such as time of day, day of month, or day of week;
identities of the network-accessible order and delivery services through which customers placed the historical orders;
identities of merchants that fulfilled the historical orders;
geographic locations associated with the merchants that fulfilled the historical orders;
etc.

An action 314 comprises obtaining or receiving the merchant data 242. In some cases, the action 314 may comprise communicating with the online services 202 through respective APIs of the online services 202. The action 314 may include receiving or otherwise determining a geographic location associated with the merchant. The merchant data may indicate additional characteristics of a merchant, such as the cuisine offered by the merchant (i.e., Chinese, American, casual, fine-dining, barbeque, fast-food, etc.), the business type of the merchant, the size of the merchant, and so forth.

In some cases, the action 314 may comprise accessing databases or other data stores of the service provider 102 to determine merchant characteristics. In some cases, the merchant will have established an account, with the order management service 220 or other online service 202, that specifies merchant information and characteristics.

In some cases, the action 314 may include analyzing the historical order data 240 to determine merchant characteristics. For example, such an analysis might reveal merchant properties such as sales rates, product offerings, product inventories, cash flows, and so forth.

An action 316 may comprise analyzing the historical order data 240, the merchant data 242, and possibly other information, to generate the one or more recommendations 238. More specifically, the action 316 may comprise determining or generating the one or more recommendations 238 regarding merchant catalogs, where the recommendations are based at least in part on the historical order data 246, the merchant data 242, and other information regarding the merchants such as their geographic locations.

Generally, the action 316 may comprise identifying a group of historical orders that were placed by comparable merchants. Comparable merchants may be identified as merchants having one or more properties in common with the requesting merchant. As examples, merchants may be in in the same geographic location, serving the same types of food, being of approximately the same size, being of the same business type, having similar sales rates and/or cash flows, etc. In some cases, merchant properties may be determined based at least in part on the merchant data 242, which may include operations data, inventory data, transaction data, and so forth. In some cases, certain merchant information may be determined by analyzing the historical order data 240.

In some embodiments, comparable merchants may be identified by analyzing merchant properties, calculating similarity metrics for the requesting merchant and each of the other merchants, and selecting the other merchants having the lowest similarity metrics.

As an example of the action 316, one recommendation might specify one or more of the order and delivery services 208 to be used by a merchant for publishing a product catalog. Another recommendation might specify one or more recommended items of a merchant to be included in the catalog and/or omitted from the catalog.

As another example of the action 316, when generating a recommendation for a merchant the recommendation service 236 might (a) identify merchants that provide products in a geographic region that includes the geographic location of the merchant; (b) determine which order and delivery services are used by those merchants in the geographic region; and (c) recommend that the merchant use the same order and delivery services.

As another example of the action 316, the recommendation service 236 might analyze orders received from customers in a geographic region that includes the geographic location of the merchant to determine which items are popular and/or in demand in that region and recommending that the merchant include those items or similar items in a product catalog.

In some cases, the action 316 may comprise comparing properties of the merchant with the properties of other merchants in a common geographic area and basing the analysis on orders fulfilled by merchants having similar properties. For example, if the merchant is a fast-food establishment, the action 316 may comprise analyzing orders fulfilled by other fast-food establishments in the same geographic area.

Any of the recommendations described above may change depending on the location of the merchant or merchant facility for which the recommendation was provided. That is, a recommendation for a facility in one location may differ from a recommendation for a similar facility in a second location.

Any of the recommendations described above may also change depending on the time (e.g., time of day, week, month, or year) for which the recommendation is provided. More specifically, the action 316 may be based at least in part on the times at which orders were placed. When providing a recommendation for a particular time of day, for example, the recommendation service 236 might analyze orders that were placed at or near that time of day. Similarly, when providing a recommendation for the current day of the week, the recommendation service 236 might analyze orders that were placed on that same day of the week.

In some cases, the action 316 may provide different recommendations throughout a day, week, month, or year. In some cases, the action 316 may recommend more than one order and delivery service. In some cases, the action 316 may dynamically vary recommendations so that each of multiple order and delivery services receives a desired amount or percent of the merchant's orders.

An action 318 comprises sending or otherwise providing the one or more recommendations to a merchant device, for display by the merchant device 204 to the associated merchant. Depending on the implementation, this might be done in different ways. In implementations where the recommendation service 236 is part of the order management service 220, the recommendations may be provided to the merchant device 204 via the order management API 224. In these embodiments, the merchant application 212 may query the order management service 220, via the API 224, to obtain the recommendations. In other implementations, where the recommendation service 236 is separate from the order management service 124, the recommendations may be provided to the order management service 220 via the recommendation service 236. In these embodiments, the merchant application 212 may query the order management service 220, via the API 224 to obtain the recommendations.

In some embodiments, a further action 320 may be performed in response to the analyzing action 316. The action 320 may comprise sending or otherwise providing the recommendations 238 to the order management service 220. More specifically, the action 320 may comprise comprising instructing the recommended network-accessible third-party service to publish the recommended catalog 322, which may involve sending the recommended catalog 322 to the order management service 220 along with a designation 324 of one or more recommended order and delivery services with which the catalog is to be published. In this situation, the action 302 of the order management service may comprise receiving the recommended catalog. Similarly, the action 304 of the order management service may comprise receiving the designation of the order and delivery service with which the catalog 322 is to be published. The action 306 may comprise communicating with the designated order and delivery service 208 to publish the recommended items or product catalogs with the recommended order and delivery services.

In some cases, the actions on the right side of FIG. 3 may be performed repeatedly or continuously, so that the recommendation service 236 updates its recommendations over time and provides updated recommendations to the order management service 220. The order management service 220 may respond by communicating with the appropriate order and delivery service 208 to change either or both of the order and delivery services with which a catalog is published and the items that are included in the catalog. In other cases, the actions on the right side of FIG. 3 may be performed in response to receiving a request from a requesting merchant. As examples, the request the request may be for a recommendation any one or more of:

an order and delivery service with which a catalog should be listed;

a schedule of different order and delivery services to be used at different times throughout a day or other time period; or items to be included in a catalog that will be listed with the recommended order and delivery service.

Note that while an individual merchant or other business entity may operate from multiple facilities, in multiple geographic locations, in this discussion it is assumed that a recommendation request concerns a specific location or region, which may for example be specified as part of a request or may be previously associated with a merchant by the service provider 102. A merchant may make different requests for recommendations relating to the different locations of its facilities or services.

Figure 4:
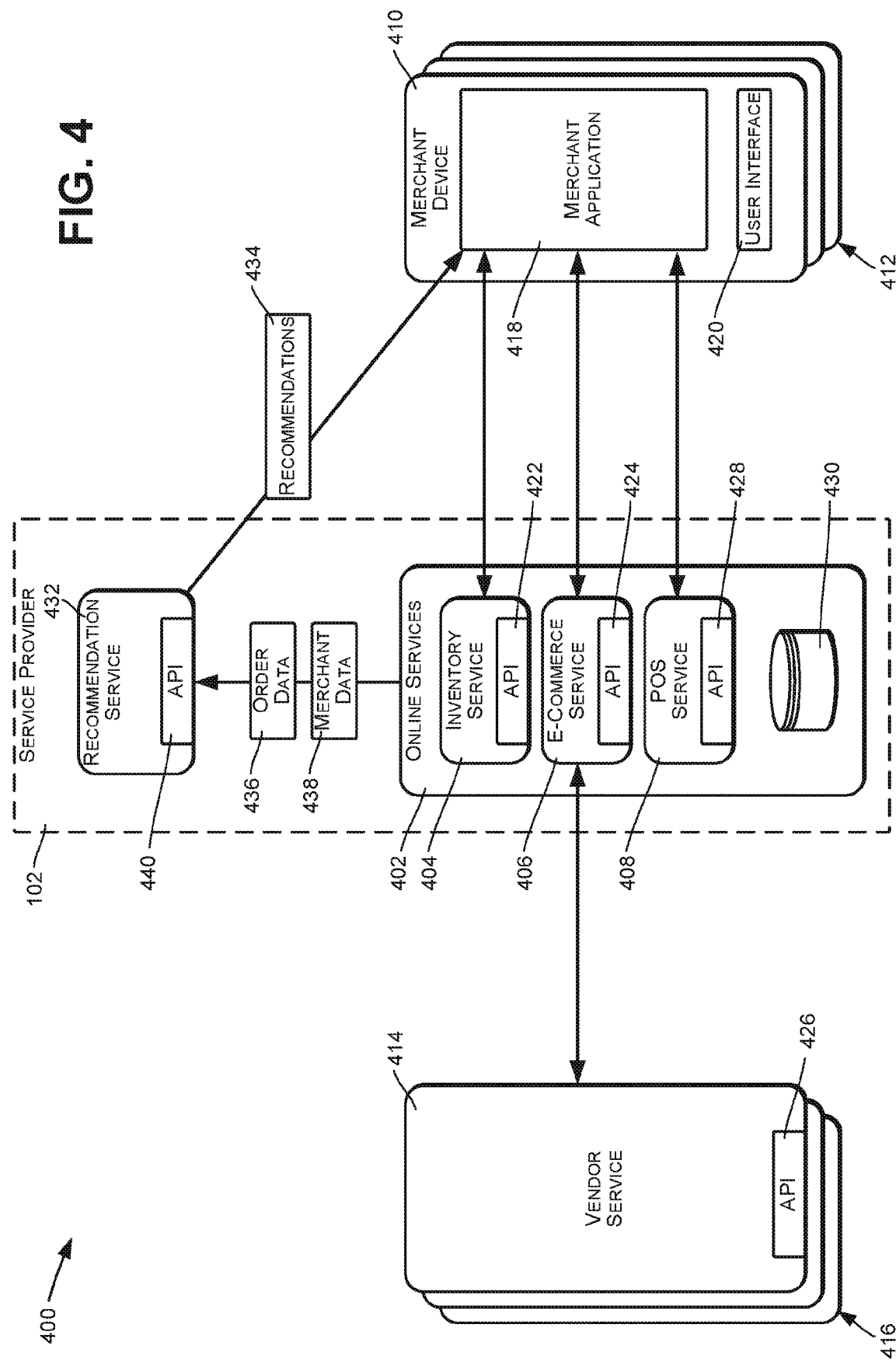
FIG. 4 is a block diagram illustrating an example architecture that may be implemented to provide recommendations regarding third-party vendor services.

FIG. 4 shows an architecture 400 as another example that may be implemented in accordance with certain of the techniques described above, such as the techniques described with reference to FIG. 1.

The architecture 400 includes online services 402, also referred to herein as merchant support services 402, which are provided by the service provider 102 for use by merchants. In this example, some of the merchants are buyers. The buyer merchants buy items from other merchants. In practice, any given merchant may be both a buyer and a seller of items. For example, a merchant may act as a buyer when purchasing products from a distributor and may act as a seller when selling the products to consumers or resellers. A distributor may similarly act as a purchaser when obtaining products from manufacturers and as a seller when selling the products to resellers.

Among other services that are not shown, the online services 402 may include a product inventory service 404, an e-commerce service 406, and a point-of-sale (POS) service 408.

The online services 402 may be implemented as a large-scale, network-based service that supports many merchants, which may be distributed across large geographic areas and may operate from or within respective business establishments. In some cases, the online services 402 may be available to business entities and consumers through pages of a website that are accessed by computing devices such as by computers, tablet computers, smartphones, or other devices that run an Internet browser or other graphical interface for accessing the website pages. In other cases, the online services 402 may expose network-accessible application programming interfaces (APIs) or other network-based interfaces that are accessible by special-purpose client software that runs on computing devices of the merchants.

In the described embodiments, the online services 402 and its sub-services 404, 406, and 408 may be implemented by multiple server computers, which may include physical computers and virtual computers, and by software that is executed by the server computers. In other embodiments, the functionality described herein as being provided by the online services 402 and its subservices 404, 406, and 408 may be provided at least in part by other components, including computing devices of the merchants themselves.

With regard to FIG. 4, a business entity acting as a supplier of products to other business entities is referred to as a vendor. The business entity acting as a buyer of products from one or more suppliers is referred to as a merchant. A vendor can be a supplier of items or services, e.g., seasonal items, perishable items, non-perishable items, year-round items, and so on. A vendor, for example, may be a wholesale distributor of products, such as a supplier of food and/or food ingredients to restaurants. A vendor can also be an entity that supplies clothing items as per season, for example sweaters in the fall season. A merchant may be a retail business such as a brick-and-mortar store, online retail seller, or other provider of goods and/or services. A restaurant is an example of a merchant that purchases items from wholesale distributors or other vendors. As noted above, in practice any given business entity may both buy and sell.

In the architecture 400, a merchant device 410 is associated with and operated by a merchant. The merchant device 410 is one of multiple merchant devices 412 that are associated with different respective merchants, which may comprise any of the merchants 106 of FIG. 1. The merchant device 410 is an example of a computer terminal that is supported by the online services 402.

A vendor service 414 is associated with and operated by a vendor. The vendor service 414 is one of multiple vendor services 416 that are associated with respective supplier merchants, which may comprise any of the merchants 106 of FIG. 1. The vendor service 414 is an example of a third-party service 108.

Operations and communications of the merchant device 410 and the vendor service 414 will be described as being representative of operations and communications that might be performed by any of the merchant devices 412 and any of the vendor services 416.

The online services 402 may be implemented as Internet-based services, and the devices 412 and 416 may communicate with the online services 402 using a communications network such as the Internet. More generally, various types of private and public networks may be used for communications between the merchant devices 412, the vendor services 416, and the online services 402, including wired networks, wireless networks (e.g., Wi-Fi), cellular networks, etc. The merchant and vendor devices 412 and 416 may also use close-range communication technologies such as Bluetooth®, Bluetooth® low energy, etc. for establishing network communications.

The inventory service 404 supports product inventory tracking for multiple merchants. The merchant device 410 may interact with the inventory service 404 to specify items that are currently in the merchant's inventory. Additionally, the inventory service 404 may interact with the merchant device 410 and/or with software components of the merchant device 410 to track various information related to merchant inventories, such as purchases of inventory items, manufacturing of inventory items, sale inventory of items, consumption of inventory items, and current validity of inventory items. The term "validity" as used herein refers to whether items are properly within the merchant's inventory or whether certain items need to be removed in some way from the merchant's inventory, such as by returning the items to their vendors, selling the items at reduced prices, throwing away the items, etc. Validity may be based on expiration dates, seasonality, shelf life, customer expiration dates, popularity, model year, etc.

In some cases, the inventory service 404 may record spoilage data such as the spoilage rates of different acquired items. The term "spoilage" refers to any loss of items and materials, including waste, scrap, expired items, stolen items, etc. Inventory recommendations can be made based on an analysis of the spoilage rates to predict future spoilage dates and to generate recommendations regarding how merchants should be ordering to decrease spoilage rates. This may include recommendations regarding frequency of ordering, vendors within which orders should be placed, quantities of orders, etc.

The inventory service 404 may also provide other types of information, including various types of recommendations. For example, the inventory service 404 may provide recommendations regarding items to be removed from inventory. Similarly, the inventory service 404 may recommend certain items, and quantities of items, that should be added to inventory. Recommendations may be based on analyzing historical data regarding a merchant. Analyses may also be based on data regarding many past transactions between various merchants and vendors. Various analysis techniques may be used, such as pattern recognition, machine learning, clustering technique, and so forth.

In some cases, the inventory service 404 may allow merchants and vendors to customize expiration timelines for perishable items. In some cases, expiration timelines may be generated and provided by the inventory service 404 based on historical data, which is analyzed to predict expiration for different types of items, from different vendors, in different seasons, in different locations, etc. These techniques account for various different characteristics that might affect expiration dates. As one example, these techniques may provide a longer timeline for cheese in the winter because cheese has been observed to expire more quickly in the winter at the particular location of a merchant.

The inventory service 404 may provide alerts to merchants when items have expired or are about to expire. In some cases, alerts such as this may be generated on a point-of-sale device as a customer is checking out, regarding an item that the customer is purchasing.

The inventory service 404 may also provide recommendations regarding placement of products relative to each other in a showroom, so that items that are nearing expiration are placed more conspicuously, such as at the fronts of shelves, at the front of the store, on endcaps, etc.

The inventory service 404 may in some embodiments be configured to recommend actions that a merchant might take to reduce loss from expiration or other product invalidity. For example, the inventory service may recommend batching an expiring item with other items to improve short-term sales of the expiring product. certain items together to help sales of an expiring item. As another example, the inventory service 404 may recommend price reductions, promotions, discounts, coupons and so forth to increase sales of expiring items. The inventory service 404 may also suggest making or emphasizing certain product offerings, such as menu items, that will utilize expiring products and therefore increase short-term consumption of expiring items. The inventory service 404 may also recommend discounts on product offering such as this to further increase consumption of the expiring items. The inventory service may also provide recommendations to reduce spoilage, such as recommending that a merchant order less volume of items that have seen higher rates of loss.

The inventory service 404 may account for seasonality when formulating recommendations. For example, an analysis of past sales by multiple merchants may indicate that purchases of certain products, such as ice cream, decrease during winter months. This observation, as well as observations or information regarding product expiration, can be factored into recommendations for future orders of ice cream by the merchant.

By tracking and analyzing sales of different items by multiple merchants, the inventory system 404 may detect patterns, such as that certain items sell better in certain seasons, certain weather, certain times of week, certain locations, and so forth. Information regarding sales patterns of different items can be utilized in order to make recommendations to merchants regarding which items should be ordered and/or stocked at any given time.

In some embodiments, the merchant device 410 may have a merchant application 418 that is executed to generate a graphical user interface (GUI) 420. The GUI 420 may be configured to accept inventory information and other information from the merchants, for use in conjunction with the inventory service 404. The merchant application 418 may access and/or communicate with the inventory service 404 through an API 422 of the inventory service 404.

The e-commerce service 406 acts as a third-party service manager to manage the use by a merchant of third-party vendors. The e-commerce service 406 supports the third-party vendors and the merchants by providing a website where the merchants can purchase the products offered by the vendors and by communicating with the vendor services on behalf of the merchants.

Through the merchant device 410, a merchant can browse products that are offered for sale by different third-party vendors and select items for purchase. The e-commerce service 406 may handle charges for purchased items. For example, the e-commerce service 406 may conduct a credit card transaction with a buying merchant and periodically pay the vendors after deducting service fees.

In some embodiments, the e-commerce service 406 may allow vendors to provide catalogs of items for sale. Each product catalog may have product specifications corresponding respectively to the items available from a vendor. For example, each product specification may include the name of a product, any available variants of the product, a description of the product, pictures of the product, reviews of the product, the price of the product, and/or any other information that may be useful to potential purchasers. The e-commerce service 406 may publish catalogs of multiple vendors, thereby allowing a merchant to purchase from different vendors.

In use, a vendor might create a catalog that is published by the e-commerce service 406. A merchant may subsequently access the website of the e-commerce service 406 in order to select and enter an order for a product from the vendor. The e-commerce service 406 might then send the order to the vendor. In some cases, the e-commerce service 406 might take care of fund transfers and bookkeeping. The e-commerce service 406 may also interact with the inventory service 404 to update and receive inventory information. In some cases, the e-commerce service 406 may interact with the POS service 408 to implement payment services.

The merchant application 418 and associated GUI 420 may be used by merchants to access the e-commerce service 406. The merchant application 418 may access and/or communicate with the e-commerce service 406 through an API 424 of the e-commerce service 406.

An example purchase facilitated by the catalog service may involve, as an example: (a) the vendor service 414 providing a catalog to the e-commerce service 406 using the API 424, (b) the merchant device 410 accessing the e-commerce service 406, through the API 424, to purchase one or more items from the catalog, and (c) the vendor service 414 receiving a purchase order for the purchased items from the e-commerce service 406 using the API 424. In some embodiments, the vendor service 414 may have an API 426 that allows communications with external entities such as the e-commerce service 406.

The POS service 408 may support POS operations in which inventory items may be scanned for inclusion in an electronic shopping cart or basket. The POS operations may include transferring funds for purchase transactions. The POS service 408 may be used in conjunction with the e-commerce service 406 to implement purchase payments.

The merchant application 418 and associated GUI 420 may be used to access the POS service 408. The GUI 420 may be configured to accept purchase information, such as identifications of items, purchase amounts, and credit card information, and to communicate with financial institutions and other third-party services in order to initiate fund transfers. The merchant application 418 may access and/or communicate with the POS service 408 through an API 428 of the POS service 408. The e-commerce service 406 may also access the POS service 408 and use it for performing payment transactions between buyers and sellers. In some implementations, the POS service 408 may also work in conjunction with the inventory service 404 to update inventory information as items are sold.

Although examples of online services 402 are described above, the service provider 102 may provide many different types of online services for the use of merchants. For example, the online services 402 may include support for seating reservations, table management, accounting, product delivery, restaurant or business management, planning, payroll, employee scheduling, and so forth.

Furthermore, although the online services 402 are described as being provided by the service provider 102, various of the online services 402 may be implemented by different providers. In some cases, some or all of the functionality described here as being performed by the online services 402 may be provided by the merchant application 418 or by other computing entities associated with the merchants.

The service provider 102 may have one or more databases 430 that store various information and data that are used by and that flow through the online services 402. The databases 430 may store data such as inventory histories for individual merchants, order histories for both buyers and sellers, transaction data for transactions with the supported merchants, account information for vendors and merchants, and so forth.

In a described embodiment, the service provider 102 implements a recommendation service 432 that provides vendor recommendations 434 to the merchant device 410. More specifically, the recommendation service 432 receives historical order data 436 from the online services 402, analyzes the historical order data 436 to generate the recommendations 434, and provides the recommendations 434 to the merchant device 410 for presentation to the associated merchant using the GUI 420 of the merchant device 410. In some embodiments, the recommendation service 432 may also receive merchant data 438 from the online services 402, and the recommendations 434 may be based in part on the merchant data 438. The order data 436 and the merchant data 438 may be obtained using one or more APIs of the online services 402, such as the API 422, the API 424, and/or the API 428.

The recommendation service 432 may be configured to receive order data and merchant data from services of entities other than the service provider 102. In some cases, order data and/or merchant data may be obtained from merchant devices and/or other sources that are controlled by or associated with merchants, in addition to data received from the online services 402 of the service provider 102.

In some embodiments the recommendation service 432 and/or its functionality may be built into a component of the online services 402, such as the e-commerce service 406, and the e-commerce service 406 may implement the functionality and actions that are attributed herein to the recommendation service 432. In other embodiments, the recommendation service 432 may be implemented as a third-party service by an entity other than the service provider 102 and may obtain the order data 436 and merchant data 438 through APIs of the online services 402 and/or other sources.

In a described embodiment, the merchant application 418 of the merchant device 410 may be configured to present a user interface option, such as an on-screen menu item or other control, for a merchant to request a vendor recommendation. In response to selection of this option, the application 418 communicates with the recommendation service 432, through a network API 440 of the recommendation service 432, to request and receive the recommendation.

In other embodiments, the merchant application 418 of the merchant device 410 may communicate with the online services 402, through any of the APIs 422, 424, and/or 428, to request and receive a recommendation. In these embodiments, the online services 402 may be configured to accept a recommendation request from the merchant device 410, to communicate with the recommendation service 432 through the API 440 to obtain the requested recommendation, and to return the recommendation to the merchant device 410.

In the embodiment of FIG. 4, the recommendation service 432 provides recommendations regarding inventory ordering by merchants. As examples, the request may be for a recommendation of any one or more of:

- a preferred vendor from which to order an item or type of item;
- a set of vendors that could be optimally used by the requesting merchant to supply the overall inventory needs of the requesting merchant;
- an optimum ordering rate for an item or type of item;
- vendor that would optimally be used as a supplier for a designated item or type of item;
- a rate (i.e., quantity and/or frequency) for the requesting merchant to order the designated product item
- a quantity of an item to order;
- items to promote in order to reduce inventory, and in particular to reduce inventory of items having upcoming expiration dates;
- promotion strategies, such as recommendations that certain items be sold together as packages or batches;
- coupon promotions, including the items for which coupons should be offered and the nature/amount of discounts represented by the coupons;
- items to remove from inventory, such as food products that are nearing expiration or products that are most often purchased in a season other than the current or upcoming season;
- items that should be moved to another location of the merchant;
- custom expiration dates that account for observed spoilage, seasonalities, slow sales, weather, and so forth; and
- placement of items within a store, such as shelves, shelf locations, etc.

In some implementations, these recommendations are determined based on past behaviors of other merchants that are similar to the requesting merchant and on observations regarding the inventories of other merchants.

In some cases, the order data may be analyzed to determine spoilage rates for individual merchants and individual products, and the recommendations attempt to minimize spoilage rates by emphasizing orders made by merchants having relatively low spoilage rates. In addition, recommendations for ordering rates may be adjusted based on observed spoilage rates for certain product items from certain vendors.

The recommendation service 432 generates recommendations for a requesting merchant by analyzing the historical order data 436 and the merchant data 438 of other comparable merchants and providing recommendations based on the behavior or and choices and selections that have already been made by the comparable merchants.

Note that although the merchant data 438 is illustrated as being provided by the online services 402, certain merchant data may also be obtained from other sources, such as from databases of the recommendation service 432 itself and/or other computing entities and databases accessible to the recommendation service 432, any of which may maintain and store merchant information such as characteristics of the merchant, types of products provided by the merchant, the geographic location of the merchant, and other information. Certain merchant data may also be obtained by analyzing the order data 436 relating to a merchant.

FIG. 5 illustrates an example method 500 of providing recommendations based on merchant characteristics and historical order data. The method 500 will be described in the context of the architecture 400 of FIG. 4, although the method 500 may also be implemented in conjunction with other environments and configurations.

The method may be performed in response to receiving a request from a requesting entity such as the merchant device 410 or the e-commerce service 406. The recommendation service 432 may receive the request via the API 440 of the recommendation service 432, as an example.

As examples, the request may be for a recommendation of any one or more of:
- a preferred vendor from which to order an item or type of item;
- an optimum ordering rate for an item or type of item;
- vendor that would optimally be used as a supplier by the requesting merchant for a designated item or type of item;
- a quantity of the item or type of item that should be ordered at the current time;
- a rate (i.e., quantity and/or frequency) for the requesting merchant to order the designated product item; or
- a set of vendors that could be optimally used by the requesting merchant to supply the overall inventory needs of the requesting merchant.

In various embodiments, the method 500, as well as the example methods 600, 700, and 800 described below, may be performed by the service provider 102, by the recommendation service 432 (which may in some cases be provided by the service provider 102), by one or more of the online services 402 such as the e-commerce service 406, or by other components. In some embodiments, the recommendation service 432 may be part of and/or implemented by the e-commerce service 406 of the online services 402, and the actions of the described methods may be performed by an order management application running on a central server of the service provider 102.

An action 502 comprises receiving order data 436 that specifies historical order information regarding orders of merchants from vendors. In a described embodiment, the order information may identify, for an individual order, (a) one or more items that are part of the order, (b) the merchant that placed the individual order, (c) the vendor with which the individual order was placed, and/or (d) the purchase price associated with the order and/or any items of the order. The order data 436 may include other information, such as product codes, item descriptions, quantities, buyer information, times of the orders, and so forth.

The order data 436 may be obtained from various sources, including databases maintained by the e-commerce service 406. For example, the e-commerce service 406 may archive processed orders in the database 430, and the action 602 may comprise retrieving the orders from the database 430 and/or querying the e-commerce service 406 through the API 424 to obtain the order data 436.

An action 504 comprises determining or obtaining merchant data 438, which may indicate one or more merchant properties. The merchant data 438 may be obtained from various sources. In some cases, the recommendation service 432 may access other online services, such as the any of the online services 402, to obtain merchant data that has been stored by those services. In some cases, for example, a merchant may maintain an account with the service provider 102, and/or with any of the online services 402, that can be accessed to obtain merchant information. In some cases, sources external to the service provider 102 may be referenced to obtain merchant information.

The merchant data may indicate, as examples, any one or more of the following:
- geographic locations associated with the merchants, such as the locations of merchant stores or facilities that will receive orders;
- a business type or category, such as whether the merchant is a restaurant, a grocery store, a hardware store, an automobile dealer, etc.;
- a cuisine, such as a cuisine offered by a restaurant;
- a brand, such as a brand sold by a car dealership;
- etc.

The merchant data 438 and the order data 436 may relate to a large number of merchants that are supported by the online services 402, and to a large number of past orders processed by the online services 402 or other online services.

An action 506 comprises analyzing the order data to obtain or determine further properties of the merchants. While the merchant data 438 may explicitly specify certain properties, such as geographic locations, business types, cuisines, brands, etc., analyzing the order data may allow determination of additional properties, which may include, as examples, any one or more of the following for each merchant:
- a geographic location associated with a merchant;
- a business type of the merchant;
- a cuisine offered by the merchant;
- a brand offered by the merchant;
- product offerings of the merchant;
- inventory or inventory history of the merchant;
- a sales rate of the merchant;
- a cash flow of the merchant;
- items ordered by the merchant;
- product offerings of the merchant;
- overall sales volume of the merchant;
- per-item sales volume of the ordering merchant;
- an order rate of each item by the merchant;
- spoilage rates incurred by the merchant for different inventory items or types of inventory items;
- an inventory history of the merchant;
- etc.

Properties such as this may also be obtained from sources such as inventory services used by the merchants, accounting systems or services used by the merchants, management software used by the merchants, POS services used by the merchants, and so forth. For example, an inventory history of a merchant may be obtained from an inventory service used by the merchant. The data sources may also include systems that are implemented locally by merchants, rather than online, network-accessible services.

An action 508 may comprise determining or generating a recommendation of the type requested by the requesting merchant. For example, a merchant may request a recommendation of a vendor from which to order a designated product. As another example, a merchant may request a recommendation of a group of vendors from which the merchant should order to fulfill inventory needs. As yet another example, a merchant may request a recommendation of a rate at which a designated item should be ordered. Methods for generating these recommendations will be described below with reference to FIGS. 6, 7, and 8, respectively.

An action 510 may comprise communicating with the requesting entity to indicate or provide the requested recommendation to the requesting entity. In some cases, the merchant device 410 may be the requesting entity. In other cases, the e-commerce service or some other service may be the requesting entity. In the context of FIG. 4, the action 510 may be performed by communicating through the API 440 of the recommendation service 432.

FIG. 6 illustrates a method 600 as an example implementation of the action 508 of FIG. 5. In the example illustrated by FIG. 6, it is assumed that a request is received from a requesting entity, such as a requesting merchant or one of the online services 402, and that the request is for a recommendation of a vendor to be used for a product item that has been designated or specified by the requesting merchant. The product item that is the subject of the recommendation request will be referred to below as the designated product item.

An action 602 comprises identifying a group of comparable merchants, consisting of merchants having characteristics similar to those of the requesting merchant. More specifically, the action 602 may comprise identifying a group of multiple merchants having properties in common with the requesting merchant, where such properties include these mentioned above with reference to the actions 504 and 506 of FIG. 5. As an example, the action 602 may comprise identifying a group of merchants that are associated with or that receive product items at a common geographic location, such as a neighborhood, city, state, or country. As another example, the action 602 may comprise identifying a group of merchants that are of the same business type as the requesting merchant, such as a group of merchants that operate restaurants. As another example, the action 602 may comprise identifying a group of merchants that have the same cuisine or product offerings as the requesting merchant. In some cases, the group of merchants may be identified as merchants having multiple properties in common with the requesting merchant, such as a common location, a common business type, a common cuisine, a common rate of sales, a common rate of product consumption, etc.

In some embodiments, comparable merchants may be identified by analyzing merchant properties, calculating similarity metrics for the requesting merchant and each of the other merchants, and selecting other merchants having the lowest similarity metrics. Various techniques may be used for determining similarity of merchants, including machine learning techniques.

In some cases, the action 602 of identifying the comparable merchants may be based at least in part on the comparative spoilage rates corresponding respectively to the ordering merchants, where the spoilage rates are those experienced by the respective ordering merchants for individual product items. Spoilage rates may be determined by analyzing order data as described above with reference to the action 506 of FIG. 5.

For purposes of discussion, the group of comparable merchants identified in the action 602 will be referred to as the identified merchant group.

An action 604 comprises identifying a group of historical orders that that (a) were placed by merchants of the identified merchant group and (b) were for the same or same type of item as the designated product item. The action 604 may be performed at varying levels of specificity, from selecting orders for the same general category of items (i.e. produce, dairy goods, clothing, etc.) to selecting orders that are all for the same product.

For purposes of discussion, the group of orders identified in the action 604 will be referred to as the identified order group.

The action 604 may also be based on other factors, such as product categories of items of the orders, times of the orders, weather conditions at the times of the orders, forecast weather conditions at the times of the orders, and so forth. For example, the action 604 may account for times of day, week, month, or year at which the orders were placed, and the identified order group may contain orders that were placed at the same time of day, week, month, or year as the time of day, week, month, or year of the request. As another example, the identified order group may contain orders that were placed during times of certain weather conditions and/or forecasted weather conditions that are the same as current or forecast weather conditions. As a more specific example, the action 604 may identify orders made by the merchants of the identified group, for the same or similar product, that were placed at the same general time of year as the time at which the request is received.

In some embodiments, the action 604 may account for spoilage rates of different merchants when identifying the identified order group and may limit the identified order group to orders made by merchants that have experienced relatively low spoilage rates of the specified item. More specifically, the action 604 may comprise selecting orders made by those merchants having the lowest spoilage rates of the specified item. That is, the action 604 may comprise selecting orders made by one or more of the merchants whose corresponding spoilage rates, for the specified item, are lower than the corresponding spoilage rates of other ordering merchants.

Spoilage rates may be determined, for example, by analyzing accounting and order data to determine inflow and outflow of different items, and to detect discrepancies. Explicit spoilage information may in some cases be obtained from inventory services used by the merchants.

An action 606 comprises analyzing the order information of the orders of the identified order group to determine a preferred vendor to be recommended as a supplier of the designated item for the requesting merchant. In some cases, this may comprise identifying at least one vendor with which one or more orders of the group of orders were placed. In some cases, the action 606 may comprise identifying the vendor with which the highest number of orders, of the identified order group, was placed. In some cases, more than one vendor may be recommended to the requesting merchant.

Figure 7:
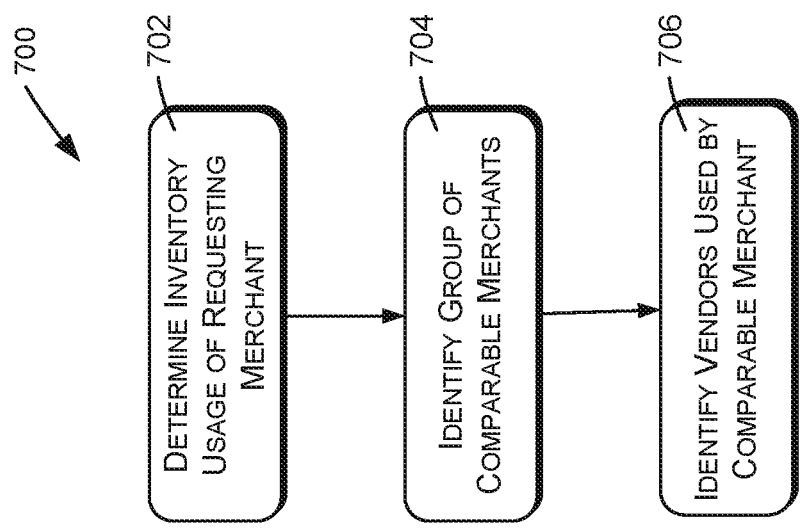

FIG. 7 illustrates a method 700 as another example implementation of the action 508 of FIG. 5. In the example illustrated by FIG. 7, it is assumed that a request is received from a requesting entity, on behalf of a requesting merchant, and that the request is for a recommendation of a group of one or more vendors that the requesting merchant should use for meeting the inventory needs of the requesting merchant.

An action 702 comprises determining the historical or projected inventory usage by the requesting merchant of various product items. In some cases, the action 702 may comprise receiving a projection from the requesting merchant regarding the rate at which the product items will be sold or consumed. In some cases, the action 702 may comprise analyzing past orders of the requesting merchant to determine historical order rates of individual product items by the requesting merchant. In some cases, the action 802 may comprise analyzing historical orders of other, comparable merchants, to determine the historical order rates of individual product items by comparable merchants in similar circumstances.

An action 704 comprises identifying a group of one or more of the ordering merchants, referred to below as the identified merchant group, that have one or more properties in common with the requesting merchant, where such properties include these mentioned above with reference to the actions 504 and 506 of FIG. 5. The action 704 may be performed as described above with reference to the action 602 of FIG. 6. The group of merchants identified in the action 704 will be referred to as the identified merchant group.

An action 706 comprises analyzing the order information of the orders of the identified merchant group to identify a group of one or more vendors that are used by the identified merchant group to supply inventory of the identified merchant group. For example, the action 706 may comprise identifying merchants having similar inventory needs and noting the vendors used by those merchants for different categories of products. The action 706 may further comprise selecting, for each category of product, the vendor service that has received the highest number of orders for product items used by the requesting merchant. In some cases, the action 706 may comprise, for each item used by the requesting merchant, selecting the vendor that has received the highest number of orders for the item from the identified merchant group.

Figure 8:
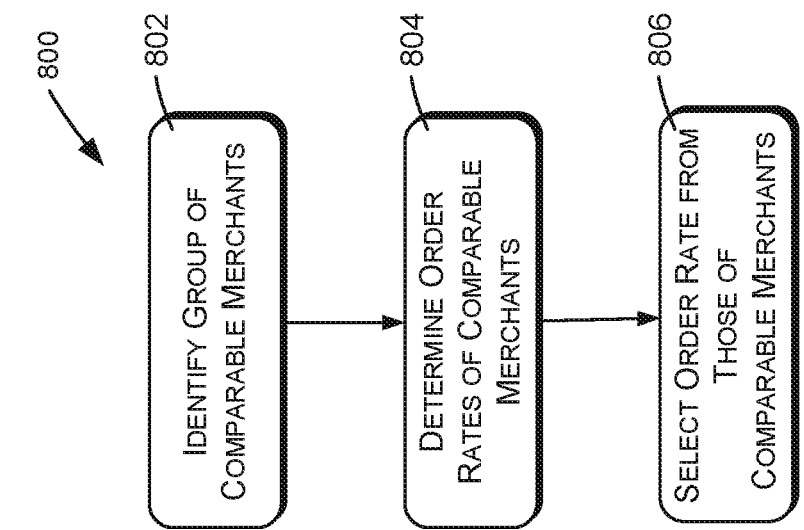

FIG. 8 illustrates a method 800 as yet another example implementation of the action 508 of FIG. 5. In the example illustrated by FIG. 8, it is assumed that a request is received from a requesting entity on behalf of a requesting merchant and that the request is for a recommendation of a rate at which a particular product item should be ordered.

An action 802 comprises identifying a group of one or more of the ordering merchants that have one or more properties in common with the requesting merchant, where such properties include these mentioned above with reference to the actions 504 and 506 of FIG. 5. The action 802 may be performed as described above with reference to the action 602 of FIG. 6. The group of merchants identified in the action 802 will be referred to as the identified merchant group.

An action 804 comprises analyzing the order information corresponding to orders by the comparable merchants to determine order rates of the designated product item by the comparable merchants.

An action 806 comprises determining or selecting a recommended order rate for the designated item by merchants of the identified merchant group. For a particular item, for example, the action 806 may comprise calculating the average order rate for the item by the identified merchant group. Other techniques may also be used for selecting an optimum order rate based on the historical order rates of the comparable merchants.

In some cases, the action 806 may be based at least in part on spoilage rates corresponding to the merchants of the identified group of merchants. For example, the action 806 may give more weight to orders made by merchants who have incurred less spoilage of the designated product. As another example, the action 806 may adjust recommended ordering rates to reduce spoilage as compared to other merchants.

Figure 9:
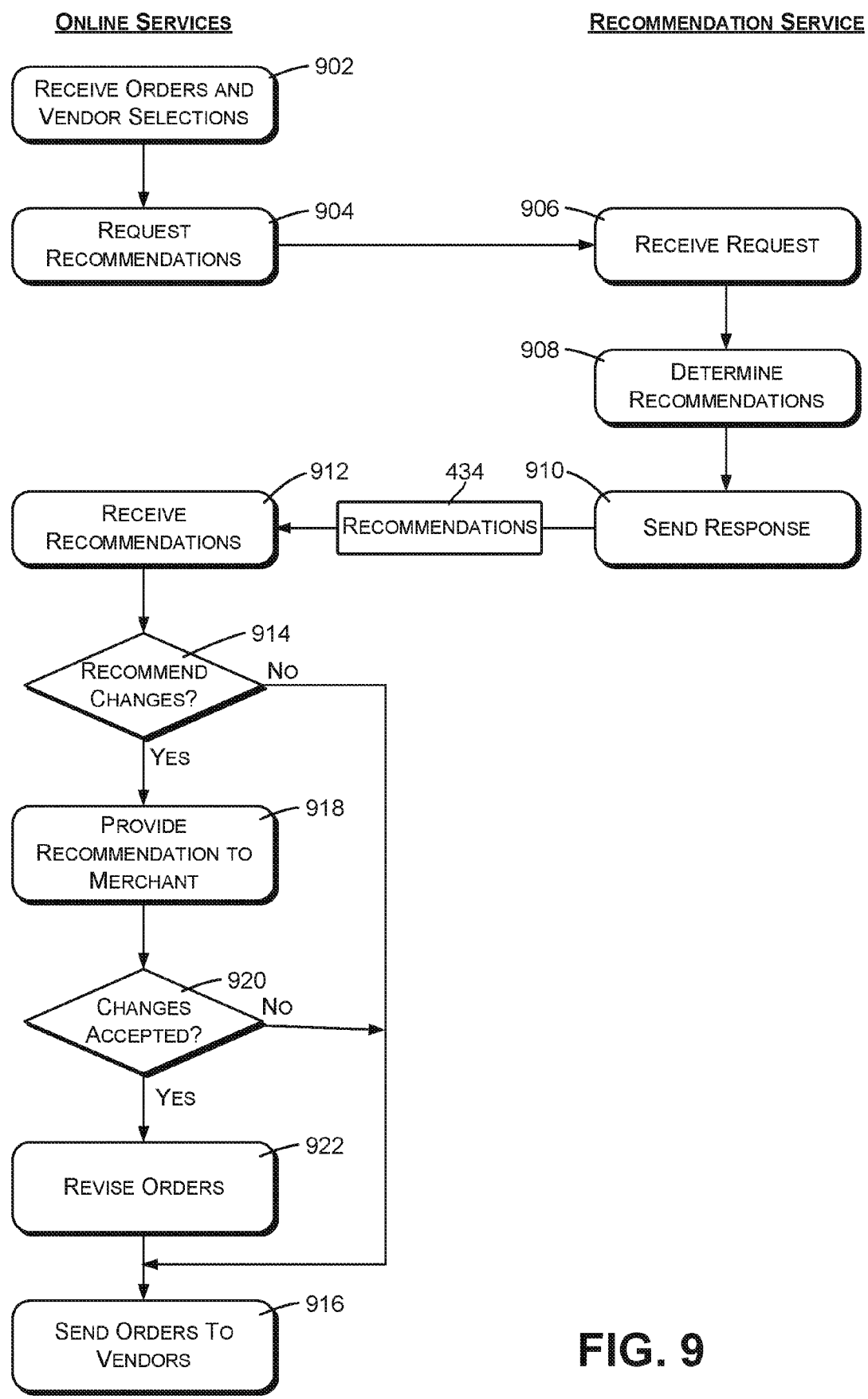

FIG. 9 illustrates an example method 900 that may be performed for managing orders that are placed by buyer merchants from merchant devices. The method 900 will be described in the context of the architecture 400 of FIG. 4, although the method 900 may also be implemented in conjunction with other environments and configurations.

Actions on the left side of FIG. 9 may be performed by the online services 402, and may include actions performed by the inventory service 404, the e-commerce service 406, the POS service 408, and/or other services. Actions on the right side of FIG. 9 may be performed by the recommendation service 432. However, note that in some embodiments the recommendation service 432 may be implemented as part of the online services 402 or as part of the subservices 404, 406, and 408 of the online services 402.

Beginning with actions performed by the online services 402, an action 902 comprises receiving an order from an ordering merchant for the purchase of products from the vendor services 416. The order may specify one or more products that are being purchased. The order may also designate the specific vendor services from which the respective items are to be purchased. As used in this context, the term "products" includes both goods and services.

In certain embodiments, the orders may be received from merchants via the merchant devices 412 and/or applications running on the merchant devices 412. In some cases, each merchant device 410 may have an instance of the merchant application 418, which can be used for interacting with the online services 402 for ordering items. The merchant application 418 may communicate through any of the APIs 404, 406, and 408.

In other embodiments, a merchant might use an Internet browser to access the online services 402. In these embodiments, the order online services 402 might implement one or more websites that can be accessed by the merchants 412 to use the inventory service 404, the e-commerce service 406, the POS service 408, and possibly other services.

An action 904 comprises sending a recommendation request to the online services 402. The request may designate one or more products of the order and may identify the ordering merchant. In some cases, the request may also designate the vendor service from which each ordered product is being purchased.

An action 906, performed by the online services 402, comprises receiving the recommendation request.

An action 908 comprise determining one or more recommendations regarding the order specified by the request. The action 908 may be performed as described above with reference to FIG. 5, as an example.

An action 910 comprises sending a response to the online services 402, where the response specifies one or more recommendations 434 regarding the items and vendors specified by the request.

An action 912, performed by the online services 402, comprises receiving the response and recommendations.

An action 914 comprises determining whether to recommend any changes to the received orders. In some cases, the action 914 may comprise analyzing the recommendations 434 to determine whether the recommendations differ from the details of the actual order. In some cases, the online services 402 may apply additional logic to determine whether recommended changes should be passed on to the ordering merchant.

Depending on the recommendations, changes may include substituting one vendor service for another, shifting a portion of the order to a different vendor service, throttling a data service, eliminating all orders from a particular vendor service, etc.

If the online services 402 determines not to recommend changes, an action 916 is performed of placing orders with different vendors for various products of the order. In this case, the vendors and the products are unchanged from the order originally received from the ordering merchant.

If the online services 402 determines to recommend one or more changes, an action 918 is performed of providing the recommendation to the ordering merchant. For example, the online services may communicate, through an API, with the merchant application 418, and the merchant application 418 may present the recommendation to the merchant. The merchant may opt either to accept or reject the recommendation. In some cases, the merchant may opt to accept or reject individual recommendations out of multiple presented recommendations.

An action 920 comprises determining whether the ordering merchant has accepted the recommendations. If the ordering merchant does not accept the recommendations, the action 916 is performed of placing orders with different vendors for various products of the order. In this case, the vendors and the products are unchanged from the order originally received from the ordering merchant.

If the ordering merchant accepts the recommendations, an action 922 is performed of revising the order to reflect the accepted recommendations. This may include adjusting quantities and changing vendor services.

The action 916 is then performed of placing orders with the different vendors for the products as specified in the revised order.

The method 900 may be performed repeatedly for orders from different ordering merchants.

Figure 10:
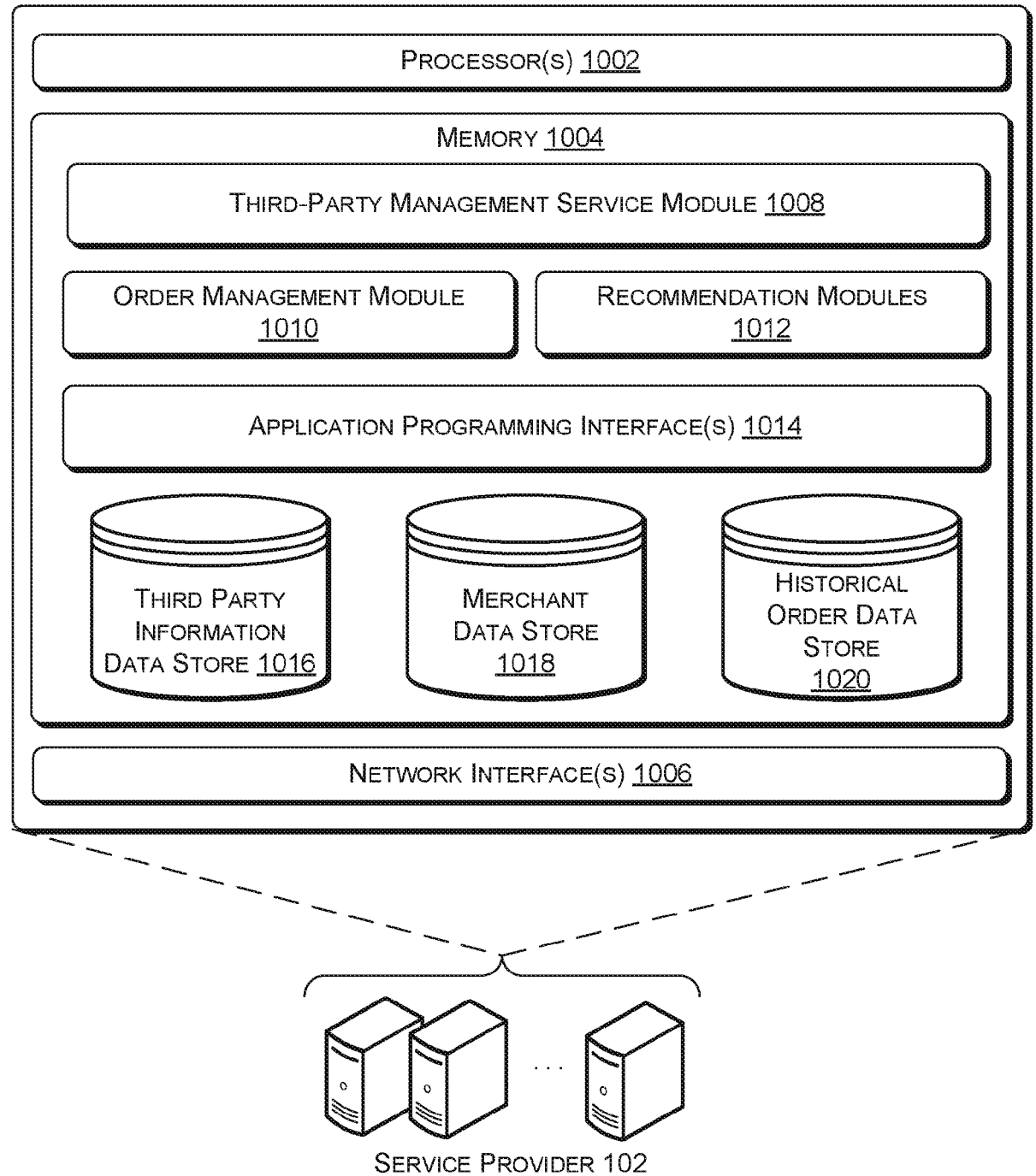
FIG. 10 is a block diagram of an example service provider that may be used in conjunction with the techniques described herein.

FIG. 10 illustrates example details of the service provider 102. The service provider 102 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like. The one or more computing devices of the service provider 102 may include one or more processors 1002, memory 1004, and one or more network interfaces 1006. The one or more processors 1002 may include a central processing unit (CPU), a graphics processing unit (GPU), a microprocessor, a digital signal processor, and so on.

The memory 1004 may include software functionality in the form of applications or modules that are stored in the memory 1004 and executed by the processor 1002. The term "module" is intended to represent example divisions of the software for purposes of discussion, and is not intended to represent any type of requirement or required method, manner or necessary organization. Accordingly, while various "modules" or components are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

As examples, the memory 1004 may include a third-party management service module 1008 that implements the functionality of the third-party management service 132, an order management module 1010 that implements the functionality of the order management service 220, and a recommendation module 1012 that implements the functionality of the recommendation service 236 and/or the recommendation service 432. Any of the order management module 1010 and recommendation modules 1012 may be part of and/or implemented by the third-party management service module 1008. That is, any of the order management module 1010 and the recommendation modules 1012 may be sub-modules of the third-party management service module 1008.

The memory 1004 may store various other software for execution by the processor 1002, including an operating system (not shown) and various applications (not shown).

The third-party management service module 1008, the order management module 1010, and the recommendation modules 1012 may interface, through one or more APIs 1014, with third-party services, with other applications running of the service provider 102, and with applications executing on merchant and/or user devices. The modules may also be configured to interface with databases associated with the third-party services and merchants in order to obtain merchant data and historical order data.

In various embodiments, the APIs 1014 as represented in FIG. 10 may include the API 224 of the order management service 220, the API 250 of the recommendation service 236, and/or the API 440 of the recommendation service 432.

The memory 1004 may be used for a third-party service information data store 1016, which is used to store information about the third-party services 108 such as, for example, a current location of the third-party service, third-party service profile information, third-party data related to orders processed, order timing, order lags, etc.).

The memory 1004 may also contain a merchant data store 1018, which is used to store merchant data such as the location or locations of the merchant, identifications of items sold by the merchant, catalogs that specify certain items of the merchant, merchant profile information, merchant types, merchant characteristics, and so on.

The memory 1004 may also contain a historical order data store 1020, which is used to store the order data described herein. In addition to the order data described above, the order data may include information regarding the order and delivery service 208. This information may include (i) delivery history information for an order and delivery service indicating an average amount of time for the order and delivery service to perform deliveries (e.g., an average amount of time per mile, a total average amount of travel time, etc.), (ii) information indicating whether or not the order and delivery service is on-time for delivery pick-up and/or drop-off, etc., (iii) vehicle information indicating a vehicle or type of vehicle that is used by the order and delivery service to transport items (e.g., a bike, car, van, truck, etc.), (iv) historical location information indicating where the order and delivery service is typically located (e.g., a home address, an establishment where the third-party service is located more than a particular amount of time, etc.), and so on.

Figure 11:
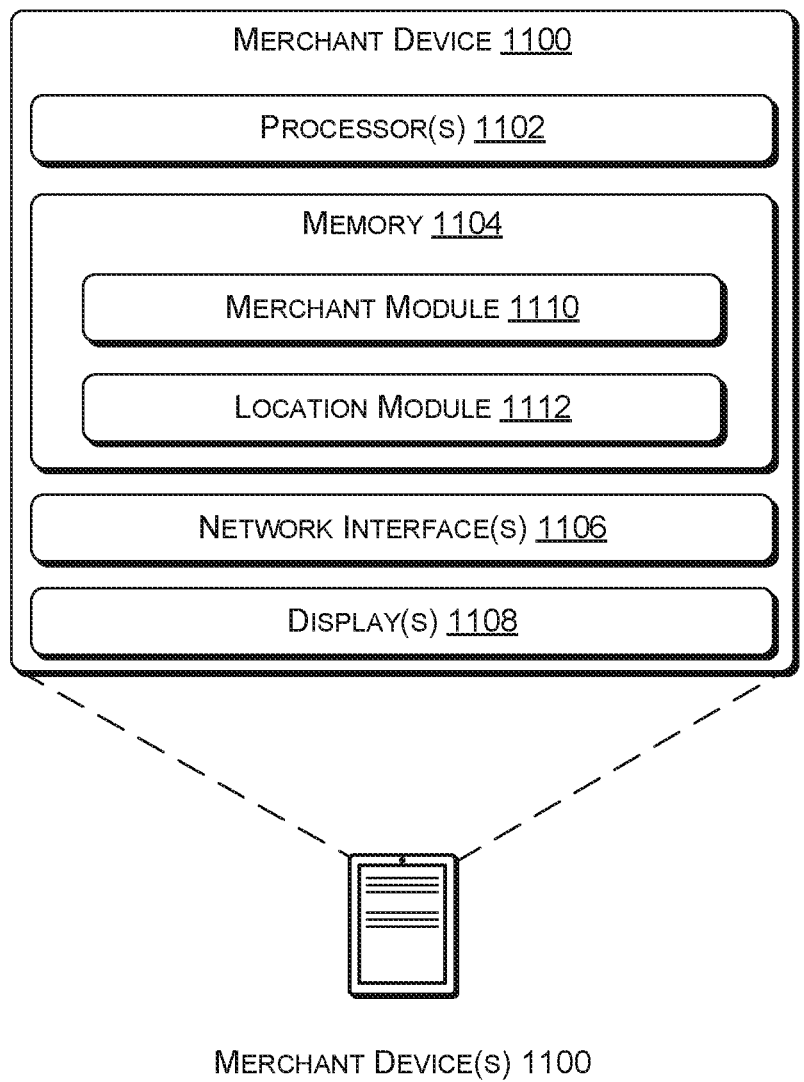
FIG. 11 is a block diagram of an example merchant device that may be used in conjunction with the techniques described herein.

FIG. 11 illustrates example details of a merchant device 1100. For example, the merchant device 1100 may be associated with and used by the merchant 106 of FIG. 1. The merchant device 1100 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a settop box, a computer system in an automobile, an appliance, a camera, a robot, a hologram system, a security system, a home-based computer system (e.g., intercom system, home media system, etc.), a projector, an automated teller machine (ATM), and so on. In one implementation, the merchant device 1100 can execute a third-party service, such as a delivery service, reservation service, menu service, review service, and so on.

The merchant device 1100 may also be associated with additional devices to manage incoming orders, reservations, appointments, notifications, updates, alerts and so on. For example, the merchant device 1100 may be associated with one or more tablets connected to or including a kitchen display system. Typically, the kitchen display system is configured to display orders coming in from various third-party services on a tablet of their own. However, using the implementations described herein, the tablets may be integrated into one such that all orders irrespective of the source are synchronized and structured to be presented and handled on a single tablet. Similarly, for reservations, the merchant device 1100 may be associated with an onsite reservation system that tracks the physical space vis-à-vis occupancy/availability.

The merchant device 1100 may include one or more processors 1102, memory 1104, one or more network interfaces 1106, and one or more displays 1108. The one or more processors 1102 may include a central processing unit (CPU), a graphics processing unit (GPU), a microprocessor, a digital signal processor, and so on. The one or more displays 1108 may include a touch screen, a liquid-crystal display (LCD), a light-emitting diode (LED) display, an organic LED display, a plasma display, an electronic paper display, or any other type of technology. Although not illustrated, the merchant device 1100 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or another sensor. The merchant device 1100 may additionally include, or be associated with, input device(s) such as a keyboard, a mouse, a pen, a voice input device, a touch input device, etc. The memory 1104 may include a merchant module 1110 and a location module 1112.

The merchant module 1110 (and/or the location module 1112) may represent a merchant-facing component that may generally be used by a merchant and may implement the functionality of the merchant application 212 or the merchant application 418. In some instances a customer may interact with the merchant-facing component (e.g., to confirm payment, provide delivery information, or provide other input). The merchant module 1110 may perform various processes to assist a merchant in facilitating transactions with customers, managing deliveries, managing inventory, and so on. The merchant module 1110 may provide various interfaces and/or dashboards. In some instances, the merchant module 1110 may be referred to as an application, such as an acquisition application for delivery orders, reservation orders, and menu updates/preferences.

The merchant module 110 may communicate with the service provider 102 to use services provided by the service provider 102. As one example, a merchant may interact with an any of the APIs shown in FIGS. 2 and 4.

The location module 1112 may determine a location of the merchant device 1100. In some instances, the location is provided to the service provider 102, or used locally, to facilitate various functions, such as determining a location of a merchant, processing of transactions when a customer is located within a particular proximity to the merchant device 1100, etc. The location module 1112 may determine a geographic location of the merchant device 1100 from geolocation techniques (e.g., satellite-based systems - global positioning system (GPS)), cell tower location data, wireless access point location data, wireless beacon location, and so forth. As such, the location module 1112 may utilize data from a location sensor of the merchant device 1100, such as a GPS receiver or communication interface that can determine (e.g., from cell towers or wireless access points) a geographic location of the merchant device 1100.

In some types of businesses, the merchant device 1100 may be associated with a store or other place of business of a merchant, and thus, may be a fixed location that typically does not change on a day-to-day basis. In other types of businesses, however, the merchant device 1100 may move locations from time to time, such as in the case where the merchant operates a food truck, is a street vendor, a cab driver, etc. or has an otherwise mobile business (e.g., in the case of merchants who sell items at buyer's homes, places of business and so forth).

While the aforementioned disclosure makes reference to user interactions via a UI presented via a display of a device, the UI can be presented via any input/output device. As an example, the UI can be output via a speaker, and augmented reality (AR) display, a virtual reality (VR) display, etc. That is, in some examples, the interactive image(s) can be presented via a speaker or an augmented reality and/or virtual reality environment. VR is an immersive experience, which simulates physical presence in a real or imagined environment. For example, a VR environment can immerse a physical, real-world person with computer-generated graphics (e.g., a dog, a castle, etc.) in a computer-generated, virtual scene via a VR display device. AR is a hybrid reality experience, which merges real worlds and virtual worlds. AR is a technology that produces AR environments where a physical, real-world person and/or objects in physical, real-world scenes co-exist with virtual, computer-generated people and/or objects in real time. For example, an AR environment can augment a physical, real-world scene and/or a physical, real-world person with computer-generated graphics (e.g., a dog, a castle, etc.) in the physical, real-world scene viewed via a AR display device.

Further, while the aforementioned disclosure makes reference to the merchant and/or customer interacting with the UI via a selectable control, in additional or alternative examples, the merchant can indicate a selection via a spoken input or other type of input.

The aforementioned description is directed to devices and applications that are related, in part, to certain technologies. However, it will be understood that the technology can be extended to any device and application. Moreover, techniques described herein can be configured to operate irrespective of the kind of services, terminals, web applications, mobile applications, network topologies, computer networks, environments, and so forth. Techniques described herein can be configured to operate in both real-time/online and offline modes. Further, techniques described herein are directed to transactions between merchants, but such techniques can be applicable for any type of entity and should not be limited to use by merchants or by customers of merchants.

Furthermore, the techniques and features described herein may be managed or organized according to various computing architectures and devices, implemented using a variety of computing processes, and/or involve varying systems of computing devices. In some examples, the services and systems described herein, such as the various elements the service provider 102, may be implemented in various computing architectures, systems, and/or platforms.

For example, the systems and services described herein may be implemented utilizing a secure, cloud-based computing platform that can scale-up and/or scale-down computing resources and storage on a permanent or an as-needed basis. The cloud-based computing platform may support the services and systems described herein using computing resources that are located in geographically disparate data centers (or other facilities) that house and manage computing devices and associated components. Users of the systems and services described herein may access the supporting computing resources provided by the data centers of the cloud-based computing platform over any wired and/or wireless network, which can be a wide area communication network ("WAN"), such as the Internet, an intranet or an Internet service provider ("ISP") network or a combination of such networks. The data centers may house computing resources, such as servers, routers, storage devices, etc., which are interconnected using one or more networks, such as local-area networks ("LANs"), or any other networking topology known in the art that connects resources in data centers. The computing resources provided by the cloud-based computing platform may include virtual machine ("VM") instances, data storage resources, database resources, networking resources, network services, and other types of computing resources. The cloud-based computing platform may include a scaling service configured to determine a number of concurrent requests being received from customer devices, merchant devices, etc., and scale-up or scale-down the computing resources to serve the concurrent requests. For example, the scaling service may spin up additional VM instances to execute software to serve requests, such as to process individual orders and other transactions on behalf of merchants and customers. The cloud-based computing platform may then execute the appropriate software in the VM instances, and store order data and merchant data (and other metadata associated with requests or events) in scalable storage.

Further, the recommendation services 236 and 432 may utilize various types of automation and/or machine-learning (ML) techniques to perform various functions described herein. For instance, many of the techniques for analyzing data to make intelligent decisions and/or recommendations may be performed using one or more ML algorithms to identify patterns in data, learn or train models to analyze data, and/or make predictions based on observed characteristics in data. The ML algorithms may be performed using general processors, and/or on specialized ML processors or hardware. The ML algorithms may include any type of supervised algorithm, unsupervised algorithm, and/or reinforced algorithm. The ML algorithms may allow the recommendation services to learn from data and improve user recommendations without human intervention by learning functions or models that intelligently map various inputs to appropriate outputs, such as by learning the structure in labeled and/or unlabeled data. The ML algorithms utilized herein can include any type of algorithm or model, such as linear regression, logistic regression, Naïve Bayes classification, neural networks (such as convolution neural networks (CNNs), artificial neural networks (ANNs), k-nearest neighbor (K-NN), etc.), clustering algorithms (such as k-means clustering), random forests, decision trees, support vector machines, and/or any other ML algorithm.

In some examples, the online services 202 and 402 may utilize and/or support various types of payment-transaction technologies, such as peer-to-peer (p2p) payment applications, card schemes, and/or digital, virtual, and/or cryptocurrency schemes, such as Blockchain, Bitcoin, and/or any other cryptocurrency.

For instance, the online services 202 and 402 may utilize blockchain systems, and/or operate blockchain systems, to implement at least portions of the techniques described herein. A blockchain may comprise a growing list of records, or "blocks," that are linked to one another using cryptography. In a blockchain, each clock contains a cryptographic hash of the previous block, a timestamp of when the block was created, and transaction data representing a transaction between multiple entities. The growing list of records, or the "distributed ledger," is a public transaction ledger that is distributed to nodes in a peer-to-peer network to decentralize the list of records and record transactions between parties in a verifiable and permanent way. In some examples, the order management service 220 and/or the e-commerce service may utilize a private blockchain that records transactions between participating entities, such as customers and merchants, that subscribe for use of the services. In this way, order data representing transactions may be stored such that personal information for the parties is verifiable, but private (e.g., through the use of hashing functions).

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method of recommending a vendor as a supplier of one or more inventory items, the method comprising:
communicating, by an order management application of a central server, via an application programming interface (API) of the order management application, with multiple merchant devices to receive orders of multiple ordering merchants associated respectively with the multiple merchant devices, each order specifying order information that includes: (a) an ordered item, (b) an ordering merchant that placed the order, and (c) a vendor with which the order was placed;
obtaining properties of the multiple ordering merchants, by the order management application, wherein the properties include, for each ordering merchant (a) a geographic location associated with the ordering merchant; (b) a business type of the ordering merchant; (c) product offerings of the ordering merchant; (d) an inventory history of the ordering merchant; and (e) a sales volume of the ordering merchant;

training a predictive model based at least in part on the properties of the multiple ordering merchants and the order information;

receiving, by the order management application, from a merchant application executing on a merchant device operated by a requesting merchant, via the API of the order management application, a request for identification of a preferred vendor to supply a designated item to the requesting merchant;

identifying, utilizing the trained predictive model, the preferred vendor based at least in part on an output of the trained predictive model using, as input, one or more properties of the requesting merchant and order information associated with orders of the requesting merchant; and associating the preferred vendor and the designated item in a merchant data record stored at the central server, wherein associating comprises designating the preferred vendor as the supplier of the designated item for the requesting merchant.

2. The method of claim 1, wherein the order information associated with the orders of the multiple ordering merchants further includes:

spoilage rates corresponding respectively to the ordering merchants.

3. The method of claim 1, further comprising:

analyzing the order information associated with the orders of the multiple ordering merchants to determine spoilage rates corresponding respectively to the ordering merchants;

determining a recommended order rate of the designated item based at least in part on the spoilage rates; and indicating the recommended order rate as a recommended rate for the requesting merchant to order the designated item.

4. A method, comprising:

receiving, via a first application programming interface (API) of an order management application of a central server, order information regarding orders of ordering merchants from vendors and properties of the ordering merchants, wherein the properties include, for individual ones of the ordering merchants, (a) a business type of the ordering merchant; (b) an inventory history of the ordering merchant; (c) a sales volume of the ordering merchant, (d) a geographic location associated with the ordering merchant; and (e) product offerings of the ordering merchant;

training a predictive model based at least in part on order information associated with the orders of the ordering merchants and the properties of the ordering merchants;

receiving, via the API, a request for identification of a preferred vendor from a merchant application associated with a merchant device of a requesting merchant, wherein the preferred vendor is to be used by the requesting merchant to supply a designated item;

identifying, utilizing the trained predictive model, the preferred vendor based at least in part on an output of the predictive model using, as input, one or more properties of the requesting merchant and order information associated with orders of the requesting merchant; and associating the preferred vendor and the designated item in merchant data stored at the central server, wherein associating comprises designating the preferred vendor as the supplier of the designated item for the requesting merchant.

5. The method of claim 4, wherein at least one of the order information associated with the orders of the requesting merchant or the order information associated with the orders of the ordering merchants comprises, for an individual order, one or more of:

product categories of items of the individual order;

time of the individual order;

weather conditions at the time of the individual order; or forecast weather conditions at the time of the individual order.

6. The method of claim 4, wherein the properties of the ordering merchants further comprise, for the individual ones of the ordering merchants, at least one of:

a cuisine offered by an individual ordering merchant of the ordering merchants;

a brand offered by the individual ordering merchant;

product offerings of the individual ordering merchant;

an inventory of the individual ordering merchant;

a sales rate of the individual ordering merchant;

a cash flow of the individual ordering merchant;

items ordered by the individual ordering merchant;

product offerings of the individual ordering merchant;

per-item sales volume of the individual ordering merchant;

an order rate of each item by the individual ordering merchant;

spoilage rates incurred by the individual ordering merchant for different inventory items or types of inventory items; or an inventory history of the individual ordering merchant.

7. The method of claim 4, wherein the order information associated with the orders of the ordering merchants comprises:

spoilage rates corresponding respectively to the ordering merchants.

8. The method of claim 4, further comprising:

analyzing the order information associated with the orders of the ordering merchants to determine spoilage rates corresponding respectively to the ordering merchants;

determining a recommended order rate of the designated item based at least in part on the spoilage rates that correspond to the one or more ordering merchants; and indicating the order rate as a recommended rate for the requesting merchant to order the designated item.

9. The method of claim 4, wherein:

the properties of the ordering merchants further include cuisines of the individual ones of the ordering merchants.

10. A method, comprising:

receiving, via an application programming interface (API) of an order management application of a central server, order information regarding orders of ordering merchants from vendors and properties of the ordering merchants, wherein the properties include, for individual ones of the ordering merchants, (a) a business type of the ordering merchant; (b) an inventory history of the ordering merchant; (c) a sales volume of the ordering merchant, (d) a geographic location associated with the ordering merchant; and (e) product offerings of the ordering merchant;

training a predictive model based at least in part on order information associated with the orders of the ordering merchants and the properties of the ordering merchants;

receiving, from a merchant application of a merchant device of a requesting merchant and via the API, a request for identification of a preferred vendor to be used by the requesting merchant to supply a designated item;

identifying, utilizing the trained predictive model, the preferred vendor based at least in part on an output of the predictive model using, as input, one or more properties of the requesting merchant and order information associated with orders of the requesting merchant; and associating the preferred vendor and the designated item in a merchant data record stored at the central server, wherein associating comprises designating the preferred vendor as the supplier of the designated item for the requesting merchant.

11. The method of claim 10, wherein the order information associated with the orders of the ordering merchants includes a quantity of orders placed by individual ordering merchants for product items used by the requesting merchant.

12. The method of claim 11, further comprising analyzing the order information associated with the orders of the ordering merchants to determine the product items used by the ordering merchants.

13. The method of claim 10, wherein the order information associated with the orders of the ordering merchants includes spoilage rates corresponding respectively to the ordering merchants.

14. The method of claim 1, wherein the API comprises a first API, the method further comprising:

communicating with multiple vendor devices via a second API, wherein a communication protocol used to communicate with a vendor device via the second API is based at least in part on a type of vendor device.

15. The method of claim 1, further comprising:

communicating, by the order management application, via the API of the order management application, with one or more of the multiple merchants to receive additional orders of the one or more of the multiple merchants; and updating the predictive model based at least in part on including data associated with the additional orders as training data.

16. The method of claim 1, further comprising:

updating one or more pending orders assigned to a former vendor to be assigned to the preferred vendor, wherein the one or more pending orders include the designated item.

17. The method of claim 1, wherein associating comprises replacing, in the merchant data, a former preferred vendor for the designated item with the preferred vendor.

18. The method of claim 4, further comprising analyzing the order information associated with the orders of the ordering merchants to determine the product items used by the ordering merchants.

* * * * *